(12) United States Patent  
Cederberg et al.

(10) Patent No.: US 12,252,008 B2  
(45) Date of Patent: Mar. 18, 2025

(54) FUEL SYSTEM WITH SACRIFICIAL NECK SLEEVE

(71) Applicant: AGILITY FUEL SYSTEMS LLC, Costa Mesa, CA (US)

(72) Inventors: Chad A. Cederberg, Lincoln, NE (US); Bradley J. Moutray, Garden City, KS (US); Seth A. Wortman, Lincoln, NE (US)

(73) Assignee: Agility Fuel Systems LLC, Costa Mesa, CA (US)

( * ) Notice: Subject to any disclaimer, the term of this patent is extended or adjusted under 35 U.S.C. 154(b) by 393 days.

(21) Appl. No.: 17/807,240

(22) Filed: Jun. 16, 2022

(65) Prior Publication Data

US 2022/0410700 A1     Dec. 29, 2022

Related U.S. Application Data

(60) Provisional application No. 63/214,122, filed on Jun. 23, 2021.

(51) Int. Cl.
    *B60K 15/07*        (2006.01)
    *B60K 15/03*        (2006.01)
              (Continued)

(52) U.S. Cl.
    CPC .............. *B60K 15/07* (2013.01); *B60K 15/04* (2013.01); *F17C 13/08* (2013.01); *B60K 2015/03453* (2013.01); *B60K 2015/0477* (2013.01)

(58) Field of Classification Search
    CPC .................... B60K 15/04; B60K 15/07; B60K 2015/03453; B60K 2015/0477; F17C 13/08

(Continued)

(56) References Cited

U.S. PATENT DOCUMENTS 1,584,313 A     5/1926    Mallory  
1,758,613 A     5/1930    Markle  
               (Continued)

FOREIGN PATENT DOCUMENTS

CN        2713283       7/2005  
CN     201317264       9/2009  
         (Continued)

OTHER PUBLICATIONS

U.S. Appl. No. 14/170,383, Modular Fuel Storage System, Jan. 31, 2014.

(Continued)

*Primary Examiner* — Mahmoud Gimie  
(74) *Attorney, Agent, or Firm* — Knobbe, Martens, Olson & Bear, LLP

(57) ABSTRACT

A fuel system is provided that includes a mounting block assembly configured to support an end of a fuel tank. The end of the fuel tank has a boss. The mounting block assembly encloses a space configured to receive the boss of the fuel tank. The fuel system also includes a bearing disposed in the space. The bearing has a support surface configured for sliding support of the boss of the fuel tank at an interface between the first portion and the second portion of the mounting block assembly. The fuel system also includes a sleeve. The sleeve is removably coupled to the boss of the fuel tank such that the sleeve is restrained longitudinally relative to the boss. The sleeve is configured to slide longitudinally relative to the support surface when the boss and sleeve are disposed on the support surface within the space of the mounting block assembly.

21 Claims, 23 Drawing Sheets

(51) Int. Cl.
  *B60K 15/04*  (2006.01)
  *F17C 13/08*  (2006.01)

(58) Field of Classification Search
  USPC .......................................................... 403/71
  See application file for complete search history.

(56) References Cited

U.S. PATENT DOCUMENTS

| | | | |
|---|---|---|---|
| 2,637,573 | A | 5/1953 | Cochrane |
| 3,294,225 | A | 12/1966 | Kenyon |
| 3,826,474 | A | 7/1974 | Pareja |
| 4,357,027 | A | 11/1982 | Zeitlow |
| 4,784,399 | A | 11/1988 | Finn |
| 4,899,901 | A | 2/1990 | Nickel |
| 5,149,041 | A | 9/1992 | Hartke |
| 5,154,556 | A | 10/1992 | Wappel |
| 5,165,700 | A | 11/1992 | Stoll et al. |
| 6,065,915 | A | 5/2000 | Ruehl et al. |
| 6,340,093 | B1 | 1/2002 | Zapp |
| 6,536,722 | B2 * | 3/2003 | Sadowski ............ F17C 13/084 248/154 |
| 6,692,028 | B2 | 2/2004 | Koster |
| 6,708,719 | B2 | 3/2004 | Idoguchi |
| 6,843,237 | B2 | 1/2005 | Bowen et al. |
| 6,986,490 | B2 * | 1/2006 | Eihusen .................... F17C 1/00 248/312 |
| 7,137,474 | B2 | 11/2006 | Yokote |
| 7,189,040 | B2 | 3/2007 | Sharp |
| 7,543,667 | B2 | 6/2009 | Hwang et al. |
| 8,051,879 | B2 | 11/2011 | Zeyfang |
| 8,545,147 | B2 | 10/2013 | Strang |
| 8,925,756 | B2 | 1/2015 | Tarapata et al. |
| 9,388,942 | B2 | 7/2016 | Sloan et al. |
| 9,873,323 | B2 | 1/2018 | Stahl |
| 9,884,552 | B2 | 2/2018 | Sloan et al. |
| 9,914,355 | B2 | 3/2018 | Sloan et al. |
| 10,195,937 | B2 | 2/2019 | Sloan et al. |
| 10,274,134 | B2 | 4/2019 | Sloan et al. |
| 10,661,954 | B2 | 5/2020 | Fresnel |
| 10,718,469 | B2 | 7/2020 | Sloan et al. |
| 11,260,744 | B2 | 3/2022 | Volkmer et al. |
| 12,071,003 | B2 | 8/2024 | Petersen et al. |
| 2005/0169724 | A1 | 8/2005 | Sharp et al. |
| 2007/0046066 | A1 | 3/2007 | Cosgrove et al. |
| 2010/0078244 | A1 | 4/2010 | Pursifull |
| 2012/0174371 | A1 | 7/2012 | Koehnan et al. |
| 2013/0001384 | A1 | 1/2013 | Karlsson et al. |
| 2014/0061266 | A1 | 3/2014 | Milton et al. |
| 2014/0217107 | A1 | 8/2014 | Sloan et al. |
| 2016/0363266 | A1 | 12/2016 | Sloan et al. |
| 2017/0129330 | A1 | 5/2017 | Sloan et al. |
| 2019/0047411 | A1 | 2/2019 | Kataoka et al. |
| 2019/0093827 | A1 * | 3/2019 | Yeggy ................... F17C 13/083 |
| 2019/0301682 | A1 | 10/2019 | Sloan et al. |
| 2022/0234439 | A1 * | 7/2022 | Petersen .......... B60K 15/03006 |

FOREIGN PATENT DOCUMENTS

| | | | |
|---|---|---|---|
| CN | 207064081 | 3/2018 | |
| DE | 3308930 | 9/1984 | |
| DE | 10 2009 006072 | 8/2009 | |
| DE | 10 2010 054231 | 6/2012 | |
| DE | 10 2012 011612 A1 | 1/2013 | |
| DE | 10 2015 005185 | 12/2015 | |
| DE | 10 2015 009032 | 1/2017 | |
| EP | 1 513 715 | 8/2016 | |
| JP | H09-315433 A | 12/1997 | |
| JP | 2008-254819 A | 10/2008 | |
| JP | 2011-126566 A | 6/2011 | |
| KR | 100925937 B1 | 11/2009 | |
| WO | WO-03106272 A2 * | 12/2003 | .............. B60P 3/055 |
| WO | WO 2014/121140 A1 | 8/2014 | |
| WO | WO 2016/075100 | 5/2016 | |
| WO | WO 2017/027478 A1 | 2/2017 | |
| WO | WO 2017/048154 | 3/2017 | |
| WO | WO 2017/145058 | 8/2018 | |
| WO | WO 2020/243611 | 12/2020 | |

OTHER PUBLICATIONS

U.S. Appl. No. 15/182,451, Modular Fuel Storage System, Jun. 14, 2016.
U.S. Appl. No. 16/379,513, Modular Fuel Storage System, Apr. 9, 2019.
U.S. Appl. No. 15/230,311, Modular Fuel Storage System, Aug. 5, 2016.
U.S. Appl. No. 16/227,879, Modular Fuel Storage System, Dec. 20, 2018.
U.S. Appl. No. 17/595,455, Fuel System With Neck Support Debris Mitigation, Nov. 17, 2021.
SKF Group, "Filament wound bushings increase MTBF for Herder", 2006, in 2 pages.

* cited by examiner

FUEL SYSTEM WITH SACRIFICIAL NECK SLEEVE

INCORPORATION BY REFERENCE TO ANY PRIORITY APPLICATIONS

Any and all applications for which a foreign or domestic priority claims is identified in the Application Data Sheet as filed with the present application are hereby incorporated by reference under 37 C.F.R. § 1.57. For example, the present application claims priority to U.S. Provisional Patent Application No. 63/214,122, filed Jun. 23, 2021, which is incorporated herein by reference in its entirety.

INCORPORATION BY REFERENCE

PCT Application No. PCT/US2020/035382, filed on May 29, 2020, titled FUEL SYSTEM WITH NECK SUPPORT DEBRIS MITIGATION, is incorporated herein by reference in its entirety.

BACKGROUND OF THE INVENTION

Field of the Invention

This application relates to fuel systems that have fuel tanks supported at a neck portion and to components and sub-assemblies therefor.

Description of the Related Art

Compressed natural gas (CNG) is an alternative fuel that provides many advantages. CNG fuels burn cleaner than other combustion fuels. CNG also can be more cost effective.

CNG fuel systems can come in several forms. One form employs a Type IV fuel tank constructed with a polymeric liner. Carbon fiber wrapped around the liner can reinforce the liner, to produce a fuel tank strong enough for use on heavy-duty trucks and other vehicles. The fuel tank can have a boss disposed at one or more ends for sealing the end portion(s) of the fuel tank. The boss can provide access to the fuel tank for filling and dispensing the fuel contained therein. The fuel tank can be integrated into a fuel system that includes a frame to support the fuel tank. The frame can support the fuel tank on a side or lateral portion of a vehicle, behind the cab of the vehicle, on a rooftop of the vehicle, or at another location. Some fuel tanks can be supported at one or both ends at the bosses.

SUMMARY OF THE INVENTION

Fuel tanks that are supported at one or more bosses can be subject to wear at the interface between the boss and the support. For example, in some cases it is observed that the fuel tank can expand and contract by small but significant amounts in a lengthwise direction. The expansion and contraction can be due to conditions such as the level of pressure in the tank, the temperature of the tank, the ambient temperature and other surrounding environmental conditions, or loading of the fuel tank. The expansion and contraction can cause relative sliding motion that can result in wear on the fuel tank, e.g., on a surface of the boss. While the fuel tank can be configured for a long service life accounting for wear, it would be an advantage to reduce fuel tank wear for a number of reasons, such as reducing maintenance and repair costs and preventing sudden material failure.

In one embodiment, a fuel system is provided that includes a tank, a mounting assembly, a first bearing block, and a second bearing block. The tank has a first boss at one end and a second boss. The second boss is located at an end of the tank opposite the first boss. The mounting assembly is configured to be coupled to a support. For example, the mounting assembly can be directly coupled to a vehicle, such as to a frame rail or can be indirectly coupled to a frame rail or a chassis portion of a vehicle by one or more other brackets or structural members. The mounting assembly can be configured to be coupled to a trailer or a stationary storage facility. The first bearing block is coupled to the mounting assembly. The first bearing block has a first inner portion comprising a first tank support surface and a wiper disposed adjacent to the first tank support surface. The second bearing block is coupled to the mounting assembly. The second bearing block has a second inner portion comprising a second tank support surface. The first bearing block being coupled to an outer surface of the first boss at the first tank support surface to form a first support connection. The second bearing block being coupled to an outer surface of the second boss at the second tank support surface to form a second support connection. The first and second support connections support the tank on the mounting assembly. The first bearing block allow the first boss to move relative to the first tank support surface while the tank is coupled to the mounting assembly. The wiper prevents debris from entering a space disposed between the first tank support surface and the first boss when the first boss move relative to the first support surface.

In another embodiment, a fuel system is provided that includes a mounting block assembly configured to support an end of a fuel tank. The end of the fuel tank has a boss. The mounting block assembly has a first portion and a second portion. The second portion is separable from the first portion. The first portion and the second portion enclose a space configured to receive the boss of the fuel tank. The fuel system also includes a bearing disposed in the space. The bearing has a support surface configured for sliding support of the boss of the fuel tank at an interface between the first portion and the second portion of the mounting block assembly. The bearing has an inboard facing surface. The inboard facing surface faces the end of the fuel tank when the fuel tank is supported by the mounting block assembly. The bearing has a wiper disposed adjacent to the support surface.

In another embodiment, a neck mount support assembly is provided that includes a mounting block assembly that is configured to support an end of a fuel tank. The end of the fuel tank has a boss. The mounting block assembly has a first portion and a second portion separable from the first portion. The first portion and the second portion enclose a space configured to receive the boss of the fuel tank. A bearing is disposed in the space. The bearing has a support surface configured for sliding support of the boss of the fuel tank at an interface. The mounting block has a wiper disposed adjacent to the support surface of the bearing. The wiper is configured to limit debris from entering the interface between the support surface and the boss.

In another embodiment a neck mount support assembly is provided that includes a mounting block and an end cap. The mounting block can be configured to support an end of a fuel tank, e.g., an end having a boss. The mounting block has a first portion and a second portion separable from the first portion. The first portion and the second portion enclose a bearing support space configured to receive the boss of the fuel tank. A bearing can be or is disposed in the bearing support space. The bearing has a support surface configured to support the boss of the fuel tank at an interface. The endcap can be connected to an outboard side of the mounting block opposite the side of the mounting block configured to face the fuel tank. The endcap can be configured to limit debris from entering the interface between the support surface and the boss.

In one variation, the neck mount support assembly can include a debris exclusion component on an inboard side of the mounting block facing the fuel tank. The debris exclusion component can include a cover. The cover can be connected to a first side of the mounting block. The first side can be the inboard side of the mounting block. The cover can be configured to limit debris from entering the interface between the support surface and the boss.

A cover, if provided, can span a length of the boss between the mounting block and the fuel tank enclosure. The cover can be secured to an outer surface of the fuel tank assembly.

A debris exclusion component on an inboard side of the neck mount support assembly can include a wiper disposed in mounting block, e.g., between the bearing and the boss. The wiper can be used alone or in combination with a cover that can cooperate to exclude debris from entering the interface between the bearing and the boss.

In another embodiment, a fuel tank assembly is provided that includes a tank, a bearing block, and a sleeve. The tank has a first boss at one end and a second boss located at an end of the tank opposite the first boss. The bearing block has a first inner portion comprising a tank component support surface. The sleeve has an inner periphery and an outer periphery. The inner periphery of the sleeve is coupled to a mounting surface of the first boss such that the sleeve is restrained longitudinally relative to the first boss and configured to slide longitudinally relative to the tank component support surface of the bearing block upon expansion of the tank when pressurized.

The sleeve can be removably coupled to the first boss and replaceable. The tank component support surface of the bearing block can comprise a more wear-resistant material than the sleeve. A length of the sleeve can be greater than a length of the tank component support surface. The sleeve can have a first edge on a first end of the sleeve and a second edge on a second end of the sleeve opposite the first end. The first edge can be chamfered. The second edge can be without a chamfer. The sleeve can have a slit extending between opposing ends of the sleeve.

In some embodiments, the fuel tank assembly includes a retaining portion. The retaining portion can be configured to removably secure the sleeve to the first boss. The retaining portion can comprise a retaining ring, threads, adhesive, and/or an interference fit. The retaining portion can comprise a retaining ring. The retaining ring can be positioned between an outer edge of the sleeve and a lip of the first boss. The retaining ring can comprise a C-shaped ring having a gap between a first end and a second end of the retaining ring. The retaining portion can be configured to allow the sleeve to slide off the first boss following removal of the retaining ring from the fuel tank assembly.

The fuel tank assembly can further comprise a second bearing block. The second bearing block can have a second inner portion comprising a second tank component support surface.

In another embodiment, a fuel tank neck support assembly is provided that includes a fuel tank assembly and a mounting block. The fuel tank assembly has a fuel tank and a sleeve. The fuel tank has a central cylindrical portion and an end assembly. The end assembly includes a dome portion extending between the central cylindrical portion and a metallic boss. The metallic boss has a mounting surface. The sleeve is removably coupled to the mounting surface of the metallic boss such that the sleeve is restrained longitudinally relative to the metallic boss. The mounting block includes a support space. The support space is configured to support a portion of the sleeve over the metallic boss. The sleeve is configured to slide longitudinally relative to the mounting block when disposed over the metallic boss and within the support space.

In some embodiments, the mounting block has a first portion and a second portion separable from the first portion. The first portion and the second portion can enclose the support space. The first portion and the second portion can each comprise a portion of a tank component support surface. The tank component support surface can be partly, e.g., half disposed on the first portion and partly, e.g., half disposed on the second portion.

In some embodiments, the mounting block includes a support surface disposed about the support space. The support surface can have a more wear-resistant material than the sleeve.

A length of the sleeve can be greater than a length of the mounting block. The sleeve can have a first edge on a first end of the sleeve and a second edge on a second end of the sleeve opposite the first end. In some embodiments, the first edge is chamfered and the second edge is not chamfered.

The sleeve can be removably coupled to the metallic boss using a retaining ring. The retaining ring can be removably positioned between an outer edge of the sleeve and a lip of the metallic boss. The fuel tank neck support assembly can include an endcap connected to an outer side of the mounting block. The endcap can have an enclosed space configured to accommodate an end of the boss.

In another embodiment, a fuel tank assembly is provided that includes a central portion, an end assembly, and a sleeve. The central portion has a carbon fiber reinforced polymeric liner. The end assembly has a dome portion extending between the central portion and a metallic boss. The metallic boss has a mounting surface. The sleeve is removably disposed about the metallic boss such that the sleeve is restrained longitudinally relative to the boss. The sleeve is configured to slide longitudinally relative to a support surface of a mounting block when the metallic boss and sleeve are disposed on the support surface within a bearing support space of the mounting block.

In some embodiments, a length of the sleeve is greater than a length of a support surface of a mounting block when the fuel tank assembly is coupled with the mounting block.

In another embodiment, a method of replacing a sacrificial sleeve on a boss of a fuel tank is provided that includes providing a fuel tank, removing a retaining ring from a boss of the fuel tank, sliding a first sleeve longitudinally away from and off of the boss of the fuel tank, and sliding a second sleeve over the boss of the fuel tank. The fuel tank can have a boss, a first sleeve having an inner surface disposed around an outer surface of the boss, and a retaining ring positioned to longitudinally retain the first sleeve with respect to the boss.

In some embodiments, the method includes coupling the retaining ring or a new retaining ring to the boss, thereby restraining the second sleeve longitudinally relative to the boss.

In some embodiments, sliding the first sleeve longitudinally away from and off of the boss includes stretching the sleeve along a seam of the sleeve, thereby creating a temporary gap between the outer surface of the boss and the inner surface of the first sleeve.

In some embodiments, sliding the second sleeve over the boss of the fuel tank includes stretching the sleeve along a seam of the sleeve, thereby creating a temporary gap between the outer surface of the boss and the inner surface of the second sleeve.

BRIEF DESCRIPTION OF THE DRAWINGS

The abovementioned and other features of the inventions disclosed herein are described below with reference to the drawings of the preferred embodiments. The illustrated embodiments are intended to illustrate, but not to limit the inventions. The drawings contain the following figures.

DETAILED DESCRIPTION OF THE PREFERRED EMBODIMENT

This application is directed to reducing ingress of debris, such as sand, dust and grit, into an interface that is provided between an outside surface of a neck portion of a fuel tank and a surface applying a load to the outside surface. The outside surface may be a cylindrical surface of a boss and the load applying surface may be a bearing or a component of a mounting block or mounting block assembly configured to support at least a portion of the weight of the tank. The ingress of such matter can produce wear at the neck portion of the fuel tank. Neck portion wear can lead to accelerated wear of the fuel tank or fuel system in which the tank is integrated, and/or to maintenance concerns of the fuel tank and/or fuel system. The incidence and severity of these outcomes can be reduced or eliminated by embodiments disclosed herein.

Figure 1:
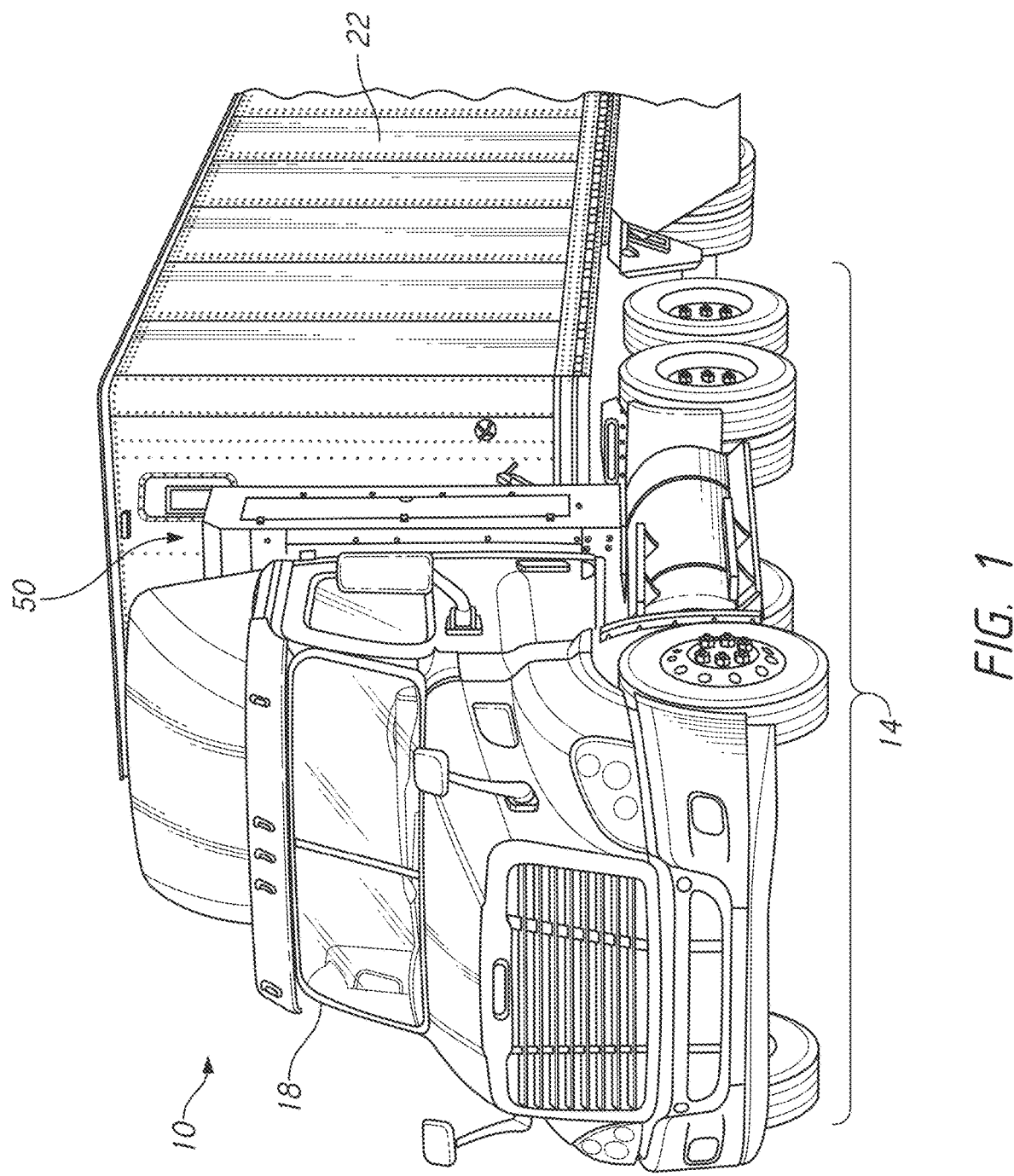
FIG. 1 is a perspective view of a tractor-trailer with a cab that has a fuel system disposed behind the cab.
Figure 2:
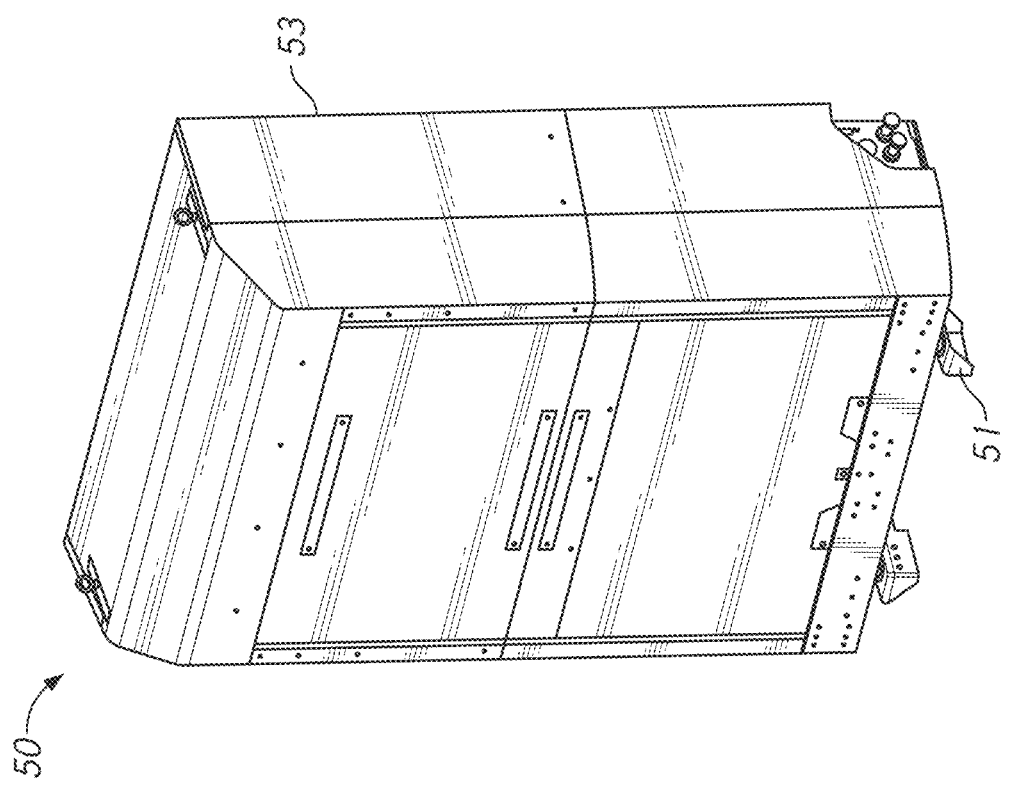
FIG. 2 is a perspective view of a fuel system mountable behind the cab of the tractor-trailer shown in FIG. 1, the fuel system having one or more fuel tanks disposed therein.

FIGS. 1 and 2 illustrate environments in which embodiments herein can be deployed. In one example, a fuel system 50 can be coupled with a vehicle 10 to provide the fuel needs therefor. In various embodiments, a vehicle 10 may refer to any mobile machine or device, including trailers and other towable assemblies, designed or used to transport passengers or cargo, including fuel. Examples of a vehicle may include cars, trucks, buses, trains, ships, boats, aircrafts and other types of vehicles as well as trailer and other component that can be towed by or coupled to any of the foregoing. More generally, the fuel system 50 could be part of a stationary facility for storage of fuel and/or for refueling a fleet. The vehicle 10 in FIG. 1 is a tractor-trailer. Classes of trucks that could benefit from the disclosed improvements herein include a light duty trucks (e.g., class 1, class 2 or class 3), medium duty trucks (e.g., class 4, class 5 or class 6), or heavy duty trucks (e.g., class 7 or class 8). Passenger vehicles, including cars, wagons, vans, buses, high-occupancy vehicles could employ the disclosed improvements as well. The vehicle 10 can be any vehicle, as discussed above, but is illustrated as a tractor-trailer with a cab 18 and a detachable portion 22, i.e., the trailer. The fuel system 50 is disposed between the cab 18 and the detachable trailer 22 but could be in other locations in other fuel systems. The connection to the vehicle 10 can be by way of mounting brackets 51 disposed on a lower portion of the fuel system 50. The fuel system 50 can include one or a plurality of fuel tanks 52 disposed in an enclosure 53. The fuel tanks 52 may be of any size, capacity, shape and/or weight and may be made of any suitable material. For example, the fuel tanks 52 may have a shape that is substantially cylindrical, rectangular, spherical, or the like. In addition, the fuel tank(s) 52 may be used to store any type(s) of fuel such as gaseous fuels (e.g., compressed natural gas) or a liquid (e.g., diesel). For example, gaseous fuels may include hydrogen or hydrogen based gas, hythane, H2CNG, or any other gas. The enclosure 53 can be mounted to a structure, e.g., to a support frame of the fuel system 50.

In one embodiment, the fuel system 50 includes a mounting assembly 62 that can include or be supported by a frame 64. The mounting assembly 62 can include a block member(s) that receives and retains one or more boss members of the fuel tank 52. The mounting assembly 62 can be coupled to the mounting brackets 51, e.g., by the first boss 54 or by other frame members between the frame 64 and the mounting brackets 51.

Figure 2A:
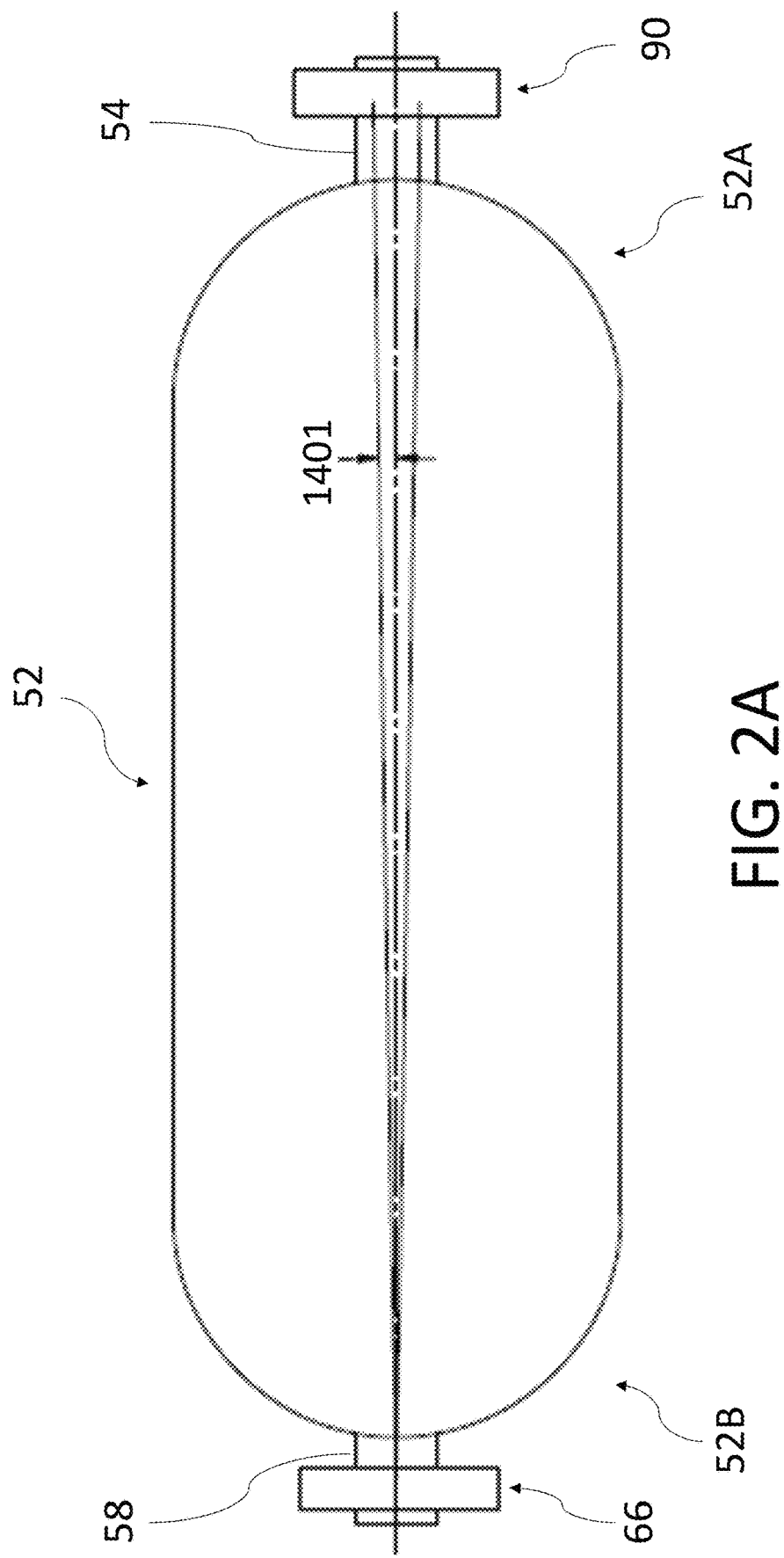
FIG. 2A is a schematic view of a fuel tank and mounting block assemblies that can be used to support the fuel tank.
Figure 3:
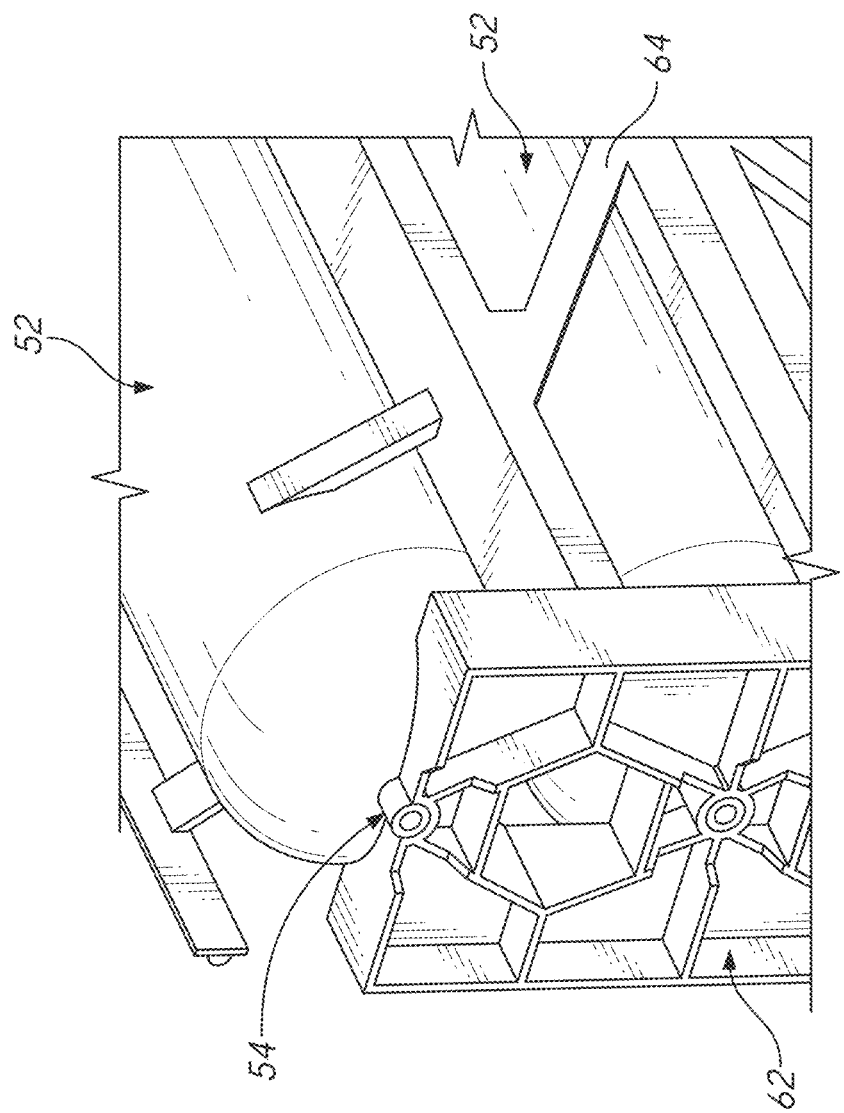
FIG. 3 is a detail view showing a mounting system for supporting neck portions of fuel tanks.
Figure 3A:
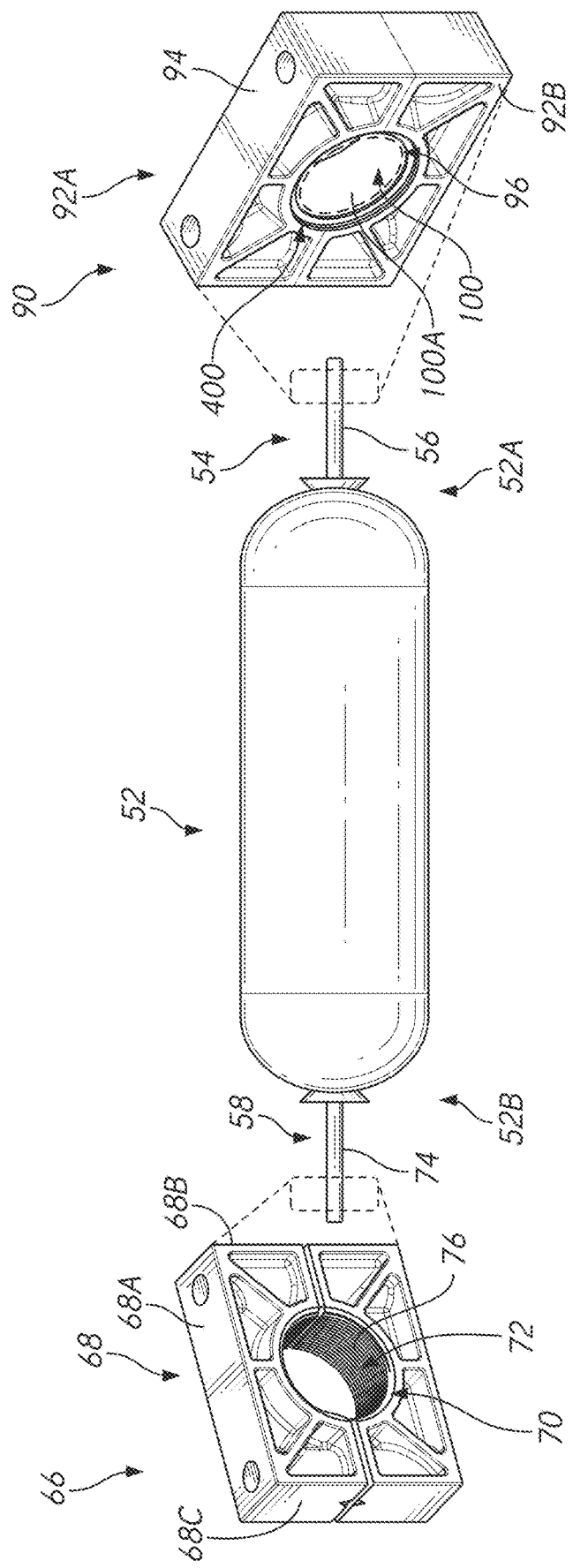
FIGS. 3A-3B are schematic views of fuel tank and mounting block assemblies that can be used to support the fuel tank while excluding debris from the assemblies.

FIGS. 2A, 3, and 3A show details of how the fuel tank 52 can be supported by a mounting block such as the mounting assembly 62 and/or the frame 64 and/or block members as discussed further below. The fuel tank 52 includes a first end 52A and a second end 52B. A cylindrical portion is disposed between the first end 52A and the second end 52B. The cylindrical portion can account for the majority of the volume of the fuel tank 52. The ends of the fuel tank 52 can be enclosed by hemispherical dome members at the first end 52A and the second end 52B. A first boss 54 can be disposed at the first end 52A. A second boss 58 can be disposed at the second end 52B. Each boss can have an outer surface, e.g., the first boss 54 can have an outer surface 56 that is exposed and that is coupled to the mounting assembly 62 as discussed below.

FIG. 3A schematically shows how a fixed bearing block assembly 66 can be integrated into the mounting assembly 62 to support the fuel tank 52 at the second boss 58. The fixed bearing block assembly 66 can include a rigid block member 68. In one embodiment the fixed bearing block assembly 66 includes a two part assembly that includes two rigid block members 68. A first rigid block member 68 is disposed generally above the second boss 58 when applied and a second rigid block member 68 is disposed generally below the second boss 58. The two rigid block members 68 can be identical, such that each provides one half of an inner periphery 70 configured to be disposed about the second boss 58. In some embodiments the first and second rigid block members 68 have a "C" shape profile when separated. The "C" shape refers to one or each of the block members 68 having a convex surface, such as one-half or a portion of the inner periphery 70 and also having external sides disposed about the inner periphery 70 or portion thereof. Each block member 68 can have a first side or portion 68A of an outer periphery thereof disposed opposite the inner periphery 70. Each block member 68 can have a second 68B and third side 68C disposed opposite of each other and at opposite ends of the first side 68A. The two rigid block members 68 can be similar or identical such that each provides a similar or identical outer periphery configured to be secured to the frame 64 or other supporting structure within the mounting brackets 51 of the fuel system 50. Apertures in the outer periphery of the rigid block member(s) 68 can allow bolts or other fasteners to secure the two or more rigid block members 68 together. In another embodiment, the fixed bearing block assembly 66 is a single member with an aperture in a center thereof providing the inner periphery 70.

The inner periphery 70 can be provided with a boss engaging feature 72, which can be one or a plurality of inner threads 76. The inner threads 76 can be configured to mate with the second boss 58 to limit, reduce or eliminate relative movement between the second boss 58 and the fixed bearing block assembly 66. In one case, the second boss 58 comprises one or a plurality of outer threads 74 that can mate with the boss engaging feature 72, e.g., with the inner threads 76. In one case, the inner threads 76 are female threads and the outer threads 74 are male threads. In another case, the inner threads 76 are male threads and the outer threads 74 are female threads. In various embodiments, the shape and dimensions (e.g., diameter, length) of the inner periphery 70 may be configured to secure or protect the second boss 58. For example, where the cross-section of the second boss 58 is a circle, the shape of the inner periphery 70 may also be circular. In other embodiments the cross-intersection of the second boss 58 is a rectangle and the shape of the inner periphery 70 may resemble a rectangle.

As noted above, the fuel tank 52 can be somewhat expanded when under pressure in part due to the materials used to form the fuel tank 52. In some cases, a longer lasting fuel system 50 results from permitting the fuel tank 52 to expand while holding the fuel tank 52 in the fuel system 50. In one embodiment, a first bearing block assembly 90 is provided that is configured to permit some movement between the first boss 54 and an inner periphery 96 configured to be disposed around the first boss 54. The inner periphery 96 provides a bearing support space for supporting a bearing which actually contacts the first boss 54 as discussed further below. The first bearing block assembly 90 can be configured to be supported in the enclosure 53, e.g., being coupled with the mounting brackets 51 directly or through the frame 64.

FIG. 3A shows that the first bearing block assembly 90 can include a first block portion 92A and a second block portion 92B. The block portions 92A, 92B can be separable in a manner similar to the rigid block member 68 of the fixed bearing block assembly 66. The first block portion 92A can be lifted off of the second block portion 92B to provide access to an inner periphery 96 of the block portions 92A, 92B. The inner periphery 96 can be shaped and sized (e.g., diameter, length) in a variety of different ways. For instance, the inner periphery 96 can be circular, triangular, rectangular, pentagonal, hexagonal and octagonal. The inner periphery 96 can be shaped in many other configurations other than those previously listed. A bearing assembly 100 can be placed in the inner periphery 96 to provide support for the first boss 54. In some embodiments, a second bearing assembly 100 similar to the first bearing assembly 100 can be provided on the second boss 58. The first bearing assembly 100 can be secured in the inner periphery 96 in any suitable manner, such as by being received in a channel therein. In some embodiments, the bearing assembly 100 can be secured in place by a fastener, pin and key, latch, or other connector. In other embodiments, the bearing assembly can be secured in place through a more permanent method, such as through welding or bonding. In various embodiments, the shape and dimensions (e.g., diameter, length) of the bearing assembly 100 may be configured to secure to the inner periphery 96. For example, where the intersection of the inner periphery 96 is a circle, the shape of the bearing assembly 100 may resemble a circle. Where the intersection of the inner periphery 96 is a rectangle, the shape of the bearing assembly 100 may resemble a rectangle.

Figure 4:
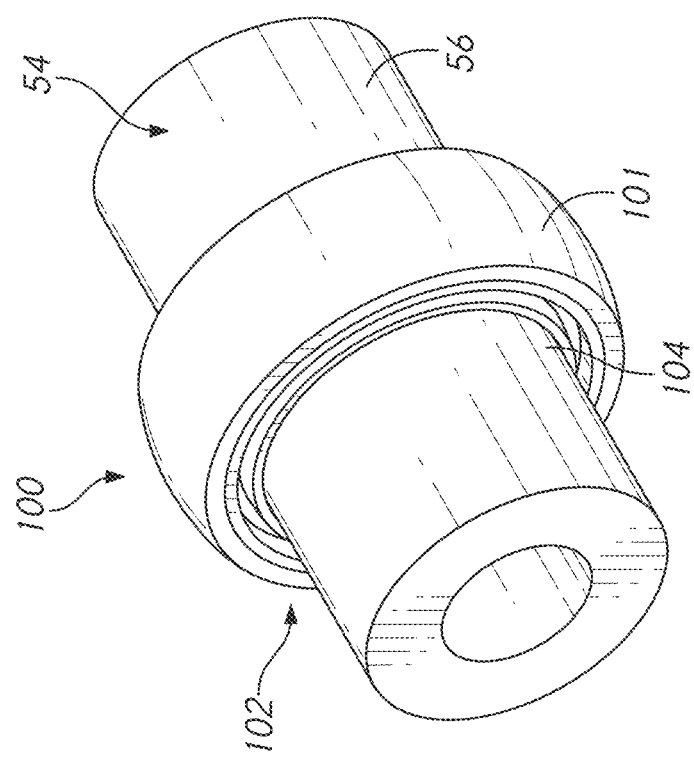
FIG. 4 is a perspective view illustrating an assembly including a neck boss component and a bearing assembly according to one example.
Figure 7:
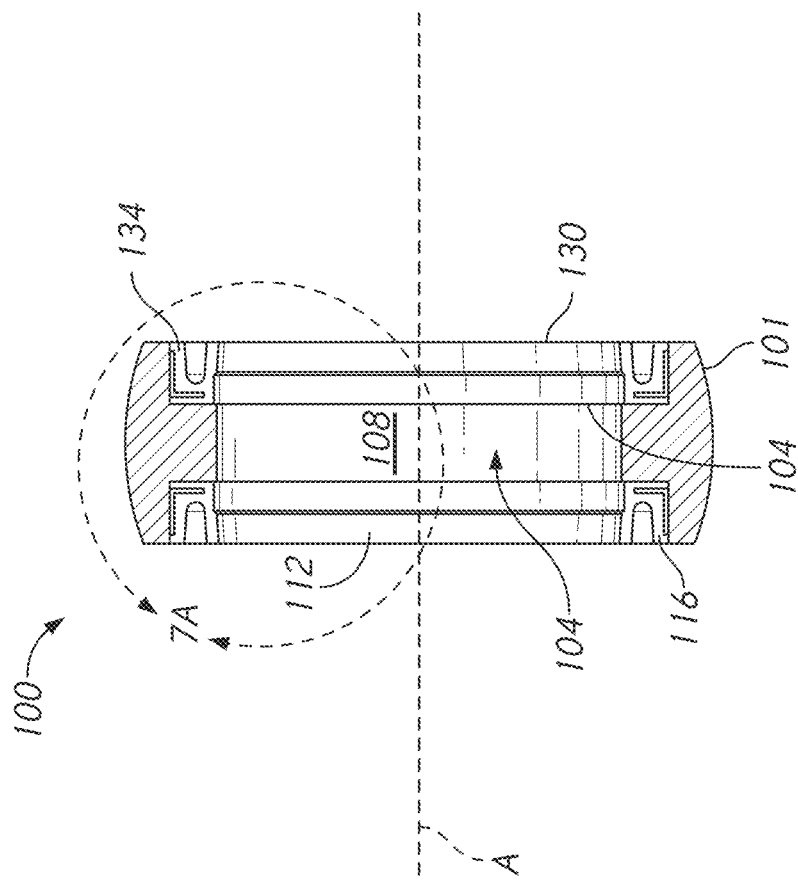
FIG. 7 is a cross-sectional view of a bearing assembly taken at section plane 7-7 in FIG. 6.

This connection can be more fully appreciated with reference to FIG. 4 in which the first bearing assembly 100 is shown positioned over the first boss 54. The first bearing assembly 100 can be seen to have a convex outer surface 101. The convex outer surface 101 can be convex in direction seen in a cross-section transverse, e.g., perpendicular to the opening through the first bearing assembly 100, as shown in FIG. 7. The convex surface can be received in a corresponding concave channel formed in the inner periphery 96 of the first bearing block assembly 90. FIG. 4 shows that a first support connection 102 is provided between the outer surface 56 of the first boss 54 and a first inner portion 104 of the first bearing assembly 100.

Figure 5:
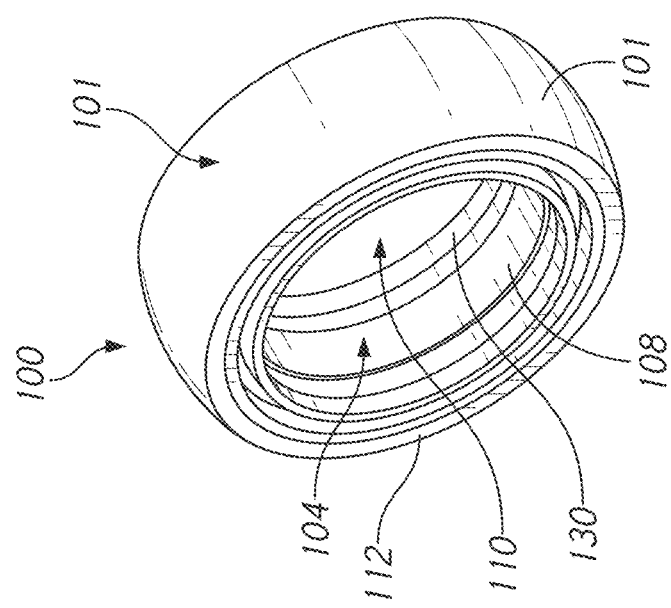
FIG. 5 is a perspective view of one embodiment of a bearing assembly that can be incorporated into a mounting block assembly.
Figure 6:
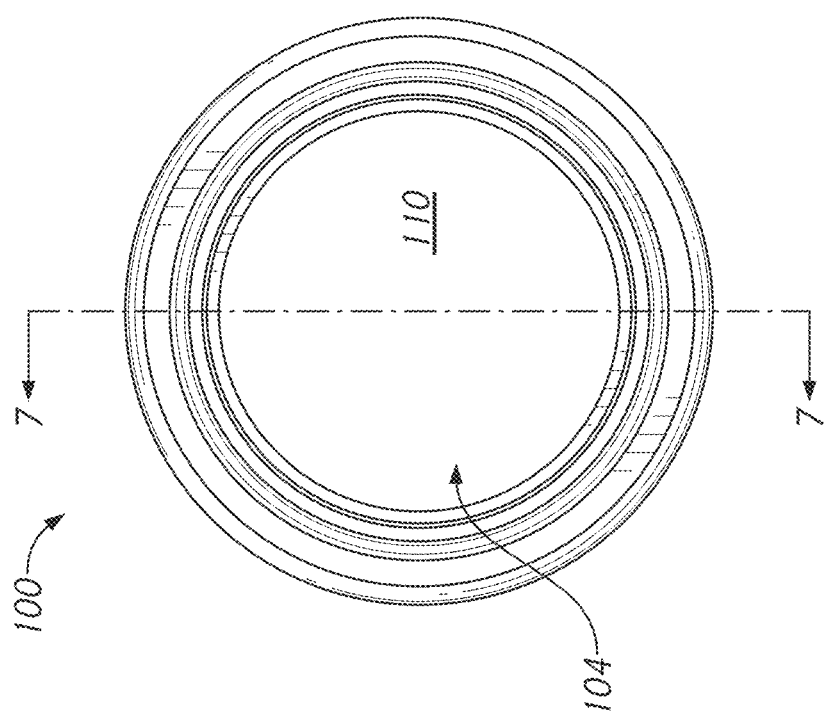
FIG. 6 is a side view of the bearing assembly of FIG. 5.

FIGS. 5-7 show the first bearing assembly 100 in more detail. The first bearing assembly 100 includes an aperture at the first inner portion 104. The aperture is sized to receive the outer surface 56 of the first boss 54. The aperture can allow a sliding connection to be formed in the first inner portion 104. The first inner portion 104 can include a first tank support surface 108. The first tank support surface 108 is configured for sliding support of the first boss 54 of the fuel tank 52 at an interface there between. The first tank support surface 108 can be a generally flat surface, e.g., forming a cylindrical portion that can be larger than the outer diameter of the outer surface 56 of the first boss 54. The first tank support surface 108 can be smooth, with a surface roughness value of anywhere between 0.025 micrometers to 100 micrometers, including about 0.05, 0.1, 0.2, 0.4, 0.8, 1.6, 3.2, 6.3, 12.5, 25, 50, and 100 micrometers. In some embodiments, the first tank support surface 108 contains bearings, such as a sleeve bearing, ball bearings or another suitable bearing. These bearings can be arranged in a ring or sleeve pattern on the first tank support surface 108.

The first tank support surface 108 can at least, in part, define a space 110 that is inward of the first tank support surface 108. The space 110 can be disposed between the first tank support surface 108 and the outer surface 56 of the first boss 54. The space 110 can be or can include a portion of an interface between the fuel tank 52 and the first bearing block assembly 90. The space 110 can benefit from the addition of a mechanism to exclude dirt, debris or other matter from the interface. By excluding such matter, the first bearing block assembly 90 and the fuel system 50 can have a longer service life, particularly in dirty environments in which heavy duty vehicles are used.

In one embodiment, the first bearing assembly 100 includes a wiper 112. The wiper 112 can be a first wiper 112 where the first bearing assembly 100 also includes a second wiper 130. The first wiper 112 can be an inboard wiper, e.g., one that is positioned between the space 110 and the cylindrical portion of the fuel tank 52. The first wiper 112 can be an outboard wiper, e.g., one that is positioned such that the block portions 92A, 92B are disposed between the first wiper 112 and the cylindrical portion of the fuel tank 52. The first wiper 112 can be outboard in the sense of being more laterally located on the fuel system 50.

The first wiper 112 and/or the second wiper 130 can be integrated into the first bearing assembly 100 in convenient manner such that they can be installed together with the first tank support surface 108, which is the surface that the outer surface 56 of the first boss 54 can rest upon. In one embodiment, the first bearing assembly 100 includes a ring member 100A that extends between the convex outer surface 101 and the first tank support surface 108. The ring member 100A can include a continuous monolithic structure from the convex outer surface 101 to the first tank support surface 108. The ring member 100A can be formed of a strong, substantially incompressible material. The ring member 100A can include a low friction material, at least adjacent to or at the first tank support surface 108. Some materials that can form the ring member 100A can include, for instance, metal (e.g., aluminum or steel), metal alloy (e.g., aluminum alloys), carbon fiber reinforced plastic, or a plastic material. The ring member 100A can be manufactured using a variety of different materials and methods. The ring member 100A may be made by any suitable process, such as, for instance, machining, milling, water jet cutting, laser cutting, stamping, pressing, sheet metal drawing, molding (e.g., injection molding), casting, rapid prototyping using additive manufacturing techniques, or any combination thereof. The ring member 100A can provide a first recess 116 disposed on a side surface thereof. The first recess 116 can be formed in the material of the ring member of the first bearing assembly 100 between the first tank support surface 108 and a lateral surface of the ring member 100A. A lateral surface in this context can be disposed in a plane perpendicular to an axis A through the first bearing assembly 100. The first recess 116 can correspond to an annular recess disposed between the material forming the first tank support surface 108 and the lateral edge of the ring member 100A of the first bearing assembly 100. The first wiper 112 can be installed in the first recess 116.

In one embodiment, the first wiper 112 has one or more, e.g., two faces that can be secured to the first recess 116. Any suitable approach can be provided to secure the first wiper 112 in the first recess 116. For example, an adhesive can be used to secure a first face of the first wiper 112 to a surface of the first recess 116. An adhesive can be used to secure a second face of the first wiper 112 to a surface of the first recess 116. When secured in the first recess 116, a free end of the first wiper 112 can be disposed in an opening through the first bearing assembly 100 that includes the space 110 disposed between the first tank support surface 108 and the axis A. For example, a free end of the first wiper 112 can be suspended at or adjacent to a lateral face of the ring member 100A of the first bearing assembly 100. The free end can comprise a free circumferential edge of the first wiper 112. The free end of the first wiper 112 can flare at least partially into the opening within the first bearing assembly 100. The free end of the first wiper 112 can flare toward the axis A and away from the first recess 116.

Figure 7A:
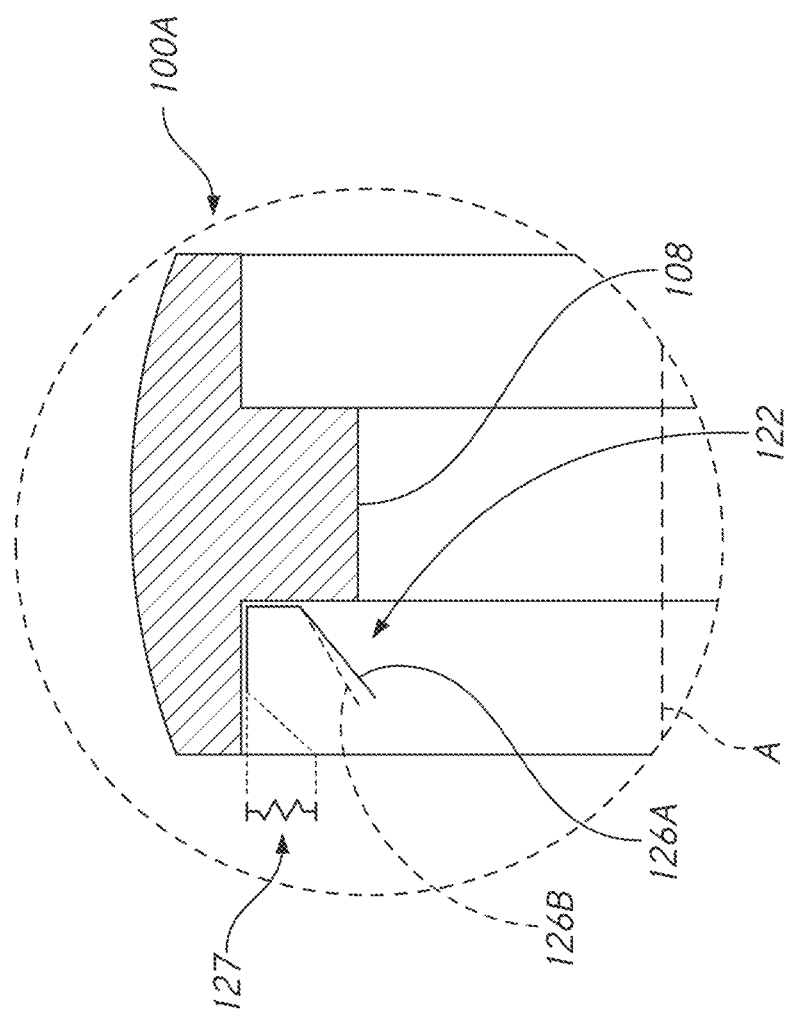
FIG. 7A is a detail view of the cross-sectional view of FIG. 7.

In some embodiments, the first wiper 112 can be resilient in structure or material. In some embodiments, the first wiper 112 can be made from a material, including rubber, silicone, metal, cork, neoprene, nitrile rubber, fiberglass, PTFE, plastic, or any combination thereof. The first wiper 112 can be manufactured by any suitable process, such as, for instance, machining, milling, water jet cutting, laser cutting, stamping, pressing, sheet metal drawing, molding (e.g., injection molding), casting, rapid prototyping using additive manufacturing techniques, or any combination thereof. The first wiper 112 can be configured such that a portion thereof, e.g., the free end thereof, can be disposed or urged toward the axis A in at least one configuration. The first wiper 112 can include a rubber ring member 120. The rubber material of the rubber ring member 120 can be springy or resilient such that upon being compressed the first wiper 112 applies a resisting force against the structure compressing the rubber ring member 120. In one case, the rubber ring member 120 includes an outer periphery 122 secured in the first recess 116 and an inner periphery 124 disposed toward the axis A. The outer periphery 122 can be disposed in a free state 126A toward the axis A by a first amount. The outer periphery 122 can be disposed in compressed state 126B toward the axis A by a second amount. The second amount can be less than the first amount, as shown in, for example, FIG. 7A. In some cases, the first wiper 112 is itself resilient. In other cases, a spring or other resilient member 127 can be disposed between the ring member of the first bearing assembly 100 and the first wiper 112 such that the first wiper 112 can be stiff but the resilient member 127 can act to press the first wiper 112 against the outer surface 56 of the first boss 54.

As discussed above, the first bearing assembly 100 can include a second wiper 130 in some cases. If provided, the second wiper 130 can be of a similar configuration as the first wiper 112. The second wiper 130 can be a mirror image configuration such that an outer periphery 122 thereof flares toward the axis A. The second wiper 130 can include or be configured as a rubber ring member. The material of the rubber ring member can be resilient to press against a portion of the outer surface 56 of the first boss 54 spaced away from the location of the first wiper 112. Thus, a first bearing assembly 100 with both the first wiper 112 and the second wiper 130 can be equipped to exclude matter, e.g., dirt and grit, from the first support connection 102, e.g., from the space 110 forming the interface between the first boss 54 and the first bearing assembly 100. A first bearing assembly 100 with both the first wiper 112 and the second wiper 130 can be equipped to exclude matter from the contact point between the first boss 54 and the supporting structure of the fuel tank 52 within the fuel system 50.

The first bearing block assembly 90 provides convenience in assembling the fuel system 50 including the first bearing block assembly 90. For example, the separability of the first block portion 92A from the second block portion 92B enables the first bearing assembly 100 to be inserted into the inner periphery 96 in the space between the block portions 92A, 92B. When separated, the first and second block portions 92A, 92B have a "C" shape profile. The "C" shape refers to the first and second block portions 92A, 92B having a first side facing away from the inner periphery 96 with a second side and a third side disposed opposite to each other and at opposite ends of the first side, similar to the block members 68 discussed above. This structure allows the ring member of the first bearing assembly 100 to be continuous which provides a more rigid structure. A continuous solid structure ring member can be more easily handled and may be more rugged with a longer service life.

Figure 3B:
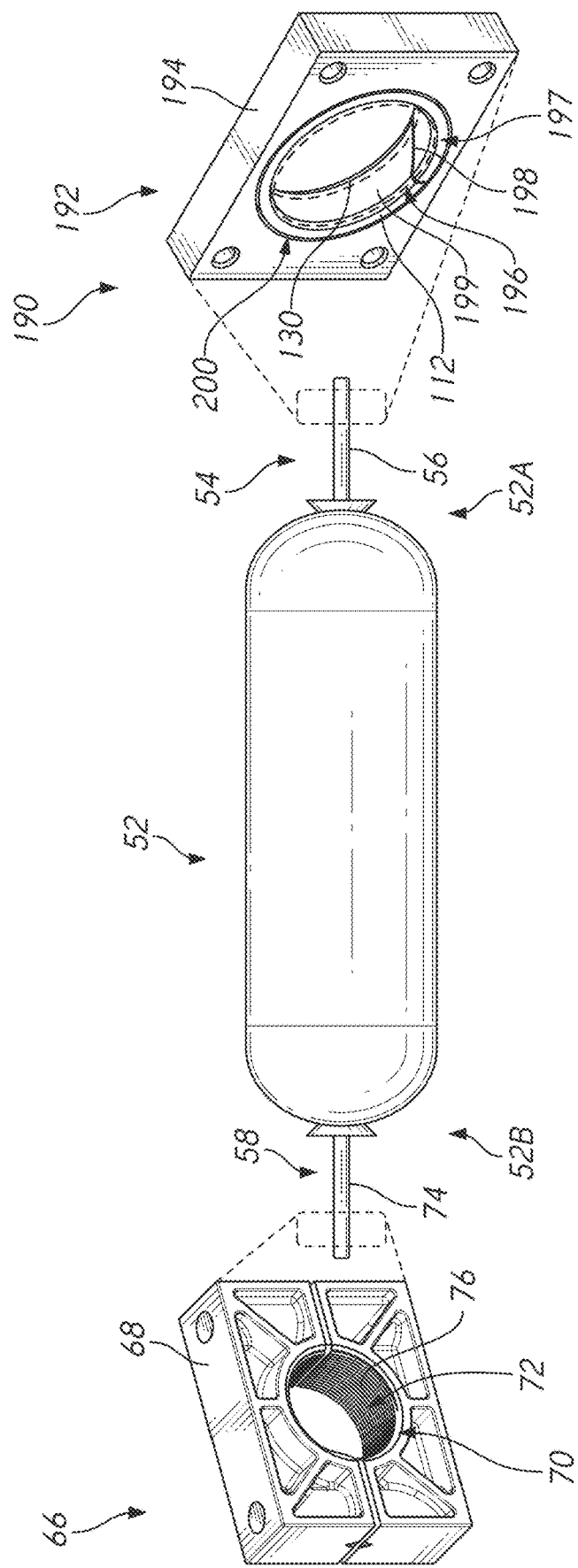

FIG. 3B shows another embodiment of a bearing block assembly 190 that provides other advantages. The assembly of FIG. 3B can be the same as the assembly of FIG. 3A except as described differently below. The first bearing block assembly 190 has a monolithic block component 192. The fuel system 50 can be formed by including the first bearing block assembly 190, e.g., by supporting the first bearing block assembly 190 with the frame 64. The block component 192 can include an outer periphery 194 coupled to the frame 64. The block component 192 can include an inner periphery 196 configured to be disposed around the first boss 54. The inner periphery 196 can be sized to surround the outer surface 56 of the first boss 54 while also providing a space for a support connection 200. The support connection 200 can include a first inner portion 204 that can comprise an assembly. The first inner portion 204 can include a bearing assembly 197 that can include a ring member 199 that has a seam 198 that facilitates placement of the first inner portion 204 within the inner periphery 196. The inner periphery 196 can include a concave channel that can receive a convex outer surface of the ring member 199 of the bearing assembly 197. The convex outer surface can be similar to the convex outer surface 101 of the first bearing assembly 100. The convex outer surface can be split at least at one location such that the ring member 199 of the bearing assembly 197 can be inserted into the inner periphery 196. The bearing assembly 197 can include one or more of the first wiper 112 and the second wiper 130. FIG. 3B shows that ring member 199 can be coupled with both the first wiper 112 and the second wiper 130.

The integration of the first wiper 112 and/or the second wiper 130 into the ring member 199 of the bearing assembly 197 can be similar to that of the first bearing assembly 100. For example, one or more of the first recess 116 and the second recess 134 can be provided in the ring member 199.

The first wiper 112 and/or the second wiper 130 can be coupled with the recesses in a suitable manner, e.g., by an adhesive connection to one or more surfaces of the recesses.

The first bearing block assembly 190 can be incorporated into fuel system assembly similar to the fuel system 50. The continuous uninterrupted configuration of the block component 192 provides more rigid support for the first boss 54 in some configurations. Also, the assembly of the fuel system 50 including the first bearing block assembly 190 is simplified in not requiring the connection of two separate block components.

Figure 8:
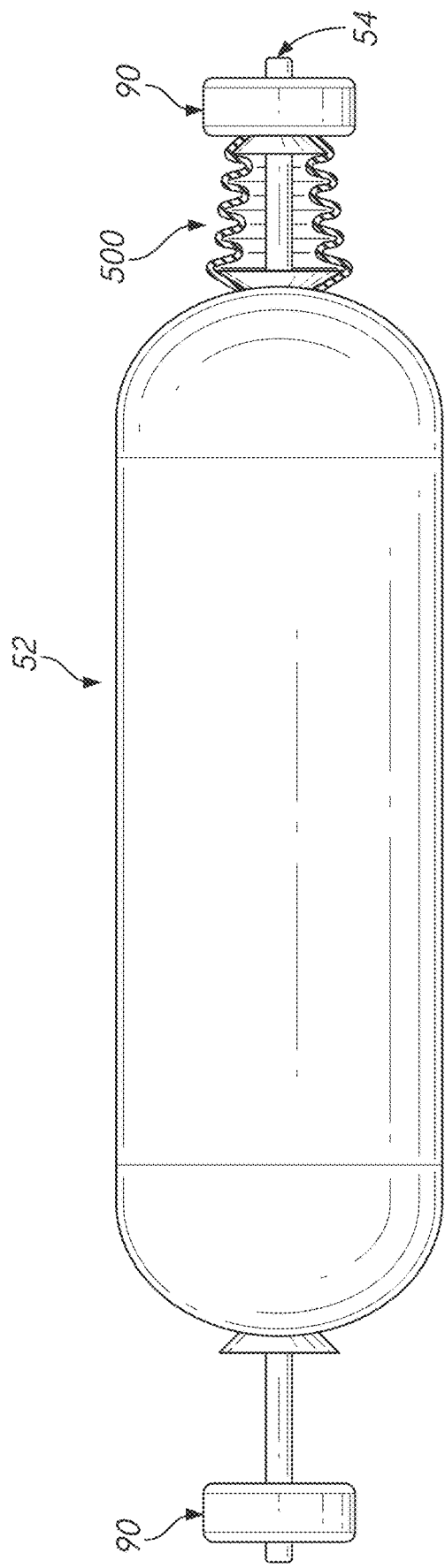
FIG. 8 is a schematic views of a fuel tank and mounting block assembly that can be used to support the fuel tank while excluding debris from the assembly.

In some embodiments, the fuel system 50 includes a bellows assembly 500. A bellows assembly 500 can include two clamps 502 and a sheath or cover 504. The cover 504 extends from one clamp 502 to the other, forming a hollow center 506. The clamp 502 can attach the bellows assembly 500 to the fuel tank 52 and the bearing block 66, 90, 190. The clamps 502 attach the bellows assembly 500 to the fuel tank 52 or bearing block 66, 90, 190 by exerting a clamping force at a connecting point 508. The connecting point 508 can be a ferrule or lip on the fuel tank 52 and/or bearing block 66, 90, 190. In some embodiments, there is no connecting point 508 and the clamps 502 connect directly to the first or second boss 54, 58. The bellows assembly 500 can simultaneously connected to two connecting points 508, such as the connecting point 508 attached to fuel tank 52 and the connecting point 508 attached to the bearing block 66, 90, 190. In FIG. 8, the cover 504 covers a section of the first boss 54 that extends between the fuel tank 52 and the bearing block 66, 90, 190.

In some embodiments, the bellows assembly 500 includes two latches instead of two clamps 502. In some embodiments, the clamps 502 are configured as ratcheting members, similar to a hose clamp. In some embodiments, the cover 504 is made from flexible material, such as natural or synthetic fabric, rubber, silicone, neoprene, nitrile rubber, PTFE, or other plastics. This flexible material allows the cover 504 to expand or contract, which thus increases or decreases the overall length of the cover 504. In some embodiments, the cover 504 has a ribbed outer surface. The ribbed outer surface allows the hollow center 506 to maintain about a steady inner circumference while the cover 504 expands or contracts.

In some embodiments, the fuel system 50 can include two or more sets of bellows assemblies 500, e.g., one for each boss 54, 58. In some embodiments, the fuel system 50 can include one of bellow assembly 500 for a single boss 54, 58. In some embodiments, the bellows assembly 500 is used in combination with a bearing block 66, 90, 190.

FIGS. 10-12C show another embodiment of a bearing block assembly 600 for use with the fuel system 50. The bearing block assembly 600 can be similar to the bearing block assemblies described elsewhere herein, the disclosure of which can supplement the disclosure hereinbelow. The disclosure of the bearing block assembly 600 can supplement the other bearing block assemblies described herein. The bearing block assembly 600 can permit some movement between the first boss 54 and the bearing block assembly 600, while also reducing the ingress of debris onto the first boss 54. The bearing block assembly 600 can exclude ingress of debris from one or both of an outboard and an inboard side. The bearing block assembly can include an inner periphery 620, which can be disposed around the first boss 54. The inner periphery 620 provides a bearing support space for supporting the first bearing assembly 100, which actually contacts the first boss 54. As discussed above, the first bearing assembly 100 includes one or more dust wipers.

Figure 11:
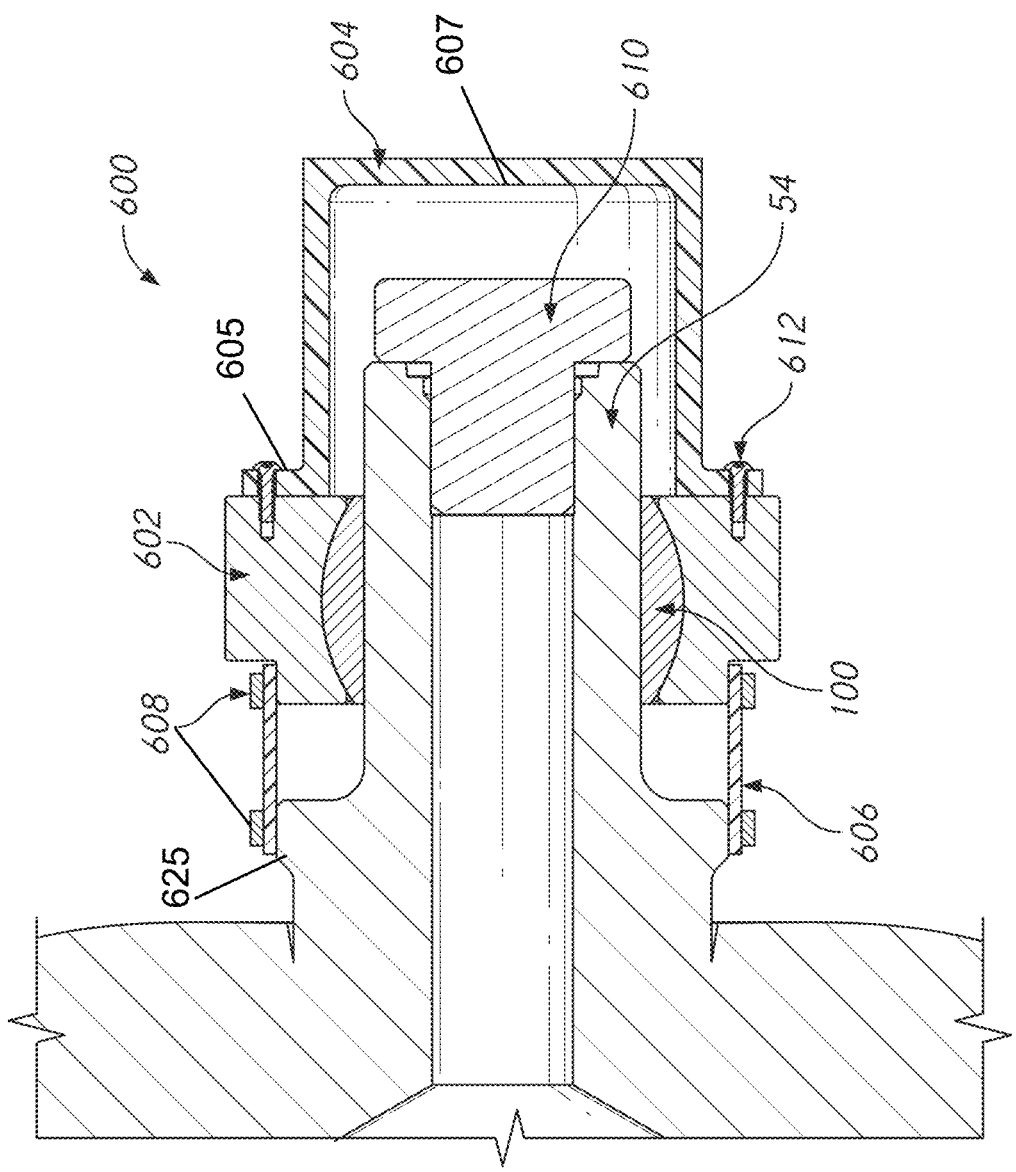
FIG. 11 is a cross-sectional view of a neck mount support assembly that includes an end cap and a cover to mitigate debris ingress from the outboard and inboard sides respectively.

In variations more or fewer wipers can be provided. In one embodiment the bearing block assembly 600 can be provided without any dust wipers in the interface between the boss 54 and the bearing surface of the assembly 100, as shown in FIG. 11. The bearing block assembly 600 can be supported in the enclosure 53. For example, the bearing block assembly 600 can be coupled with the mounting brackets 51 directly or through the frame 64.

Figure 10:
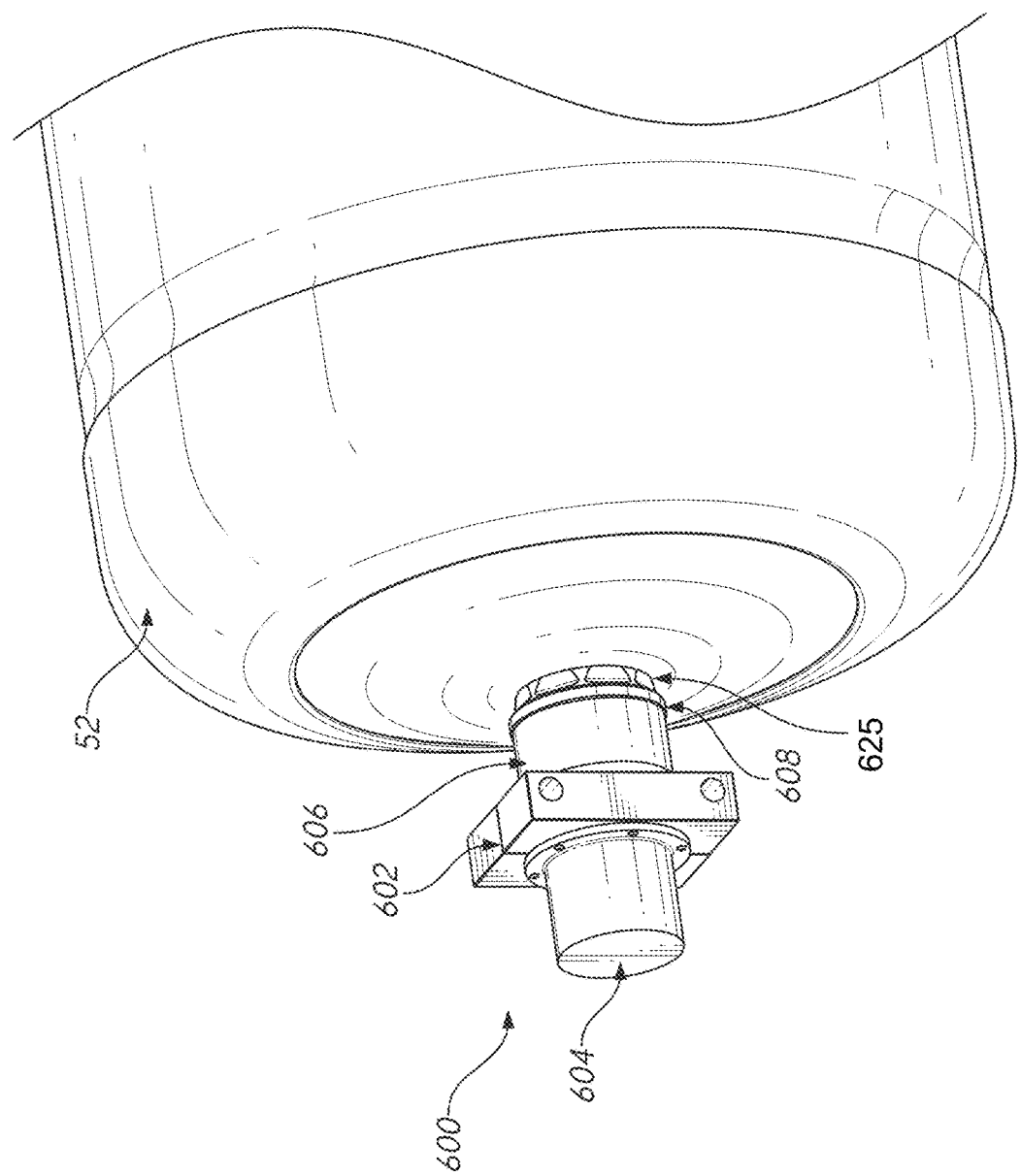
FIG. 10 is a perspective view of an embodiment of a fuel tank and mounting block assembly that can mitigate and even exclude debris from an interface between a fuel tank boss and a bearing of a mounting block assembly.
Figure 12A:
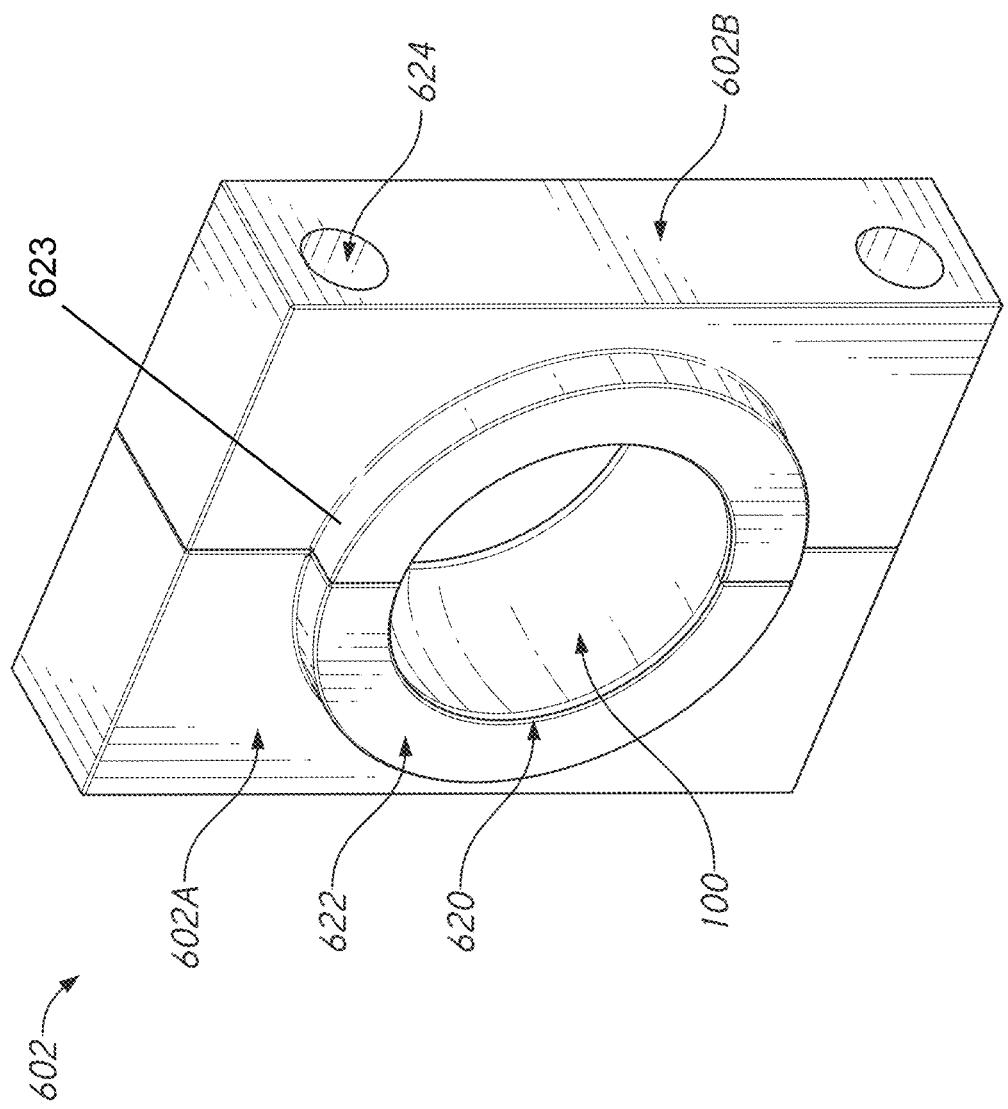
FIG. 12A is a perspective view of an inboard side of one embodiment of a mounting block.
Figure 12B:
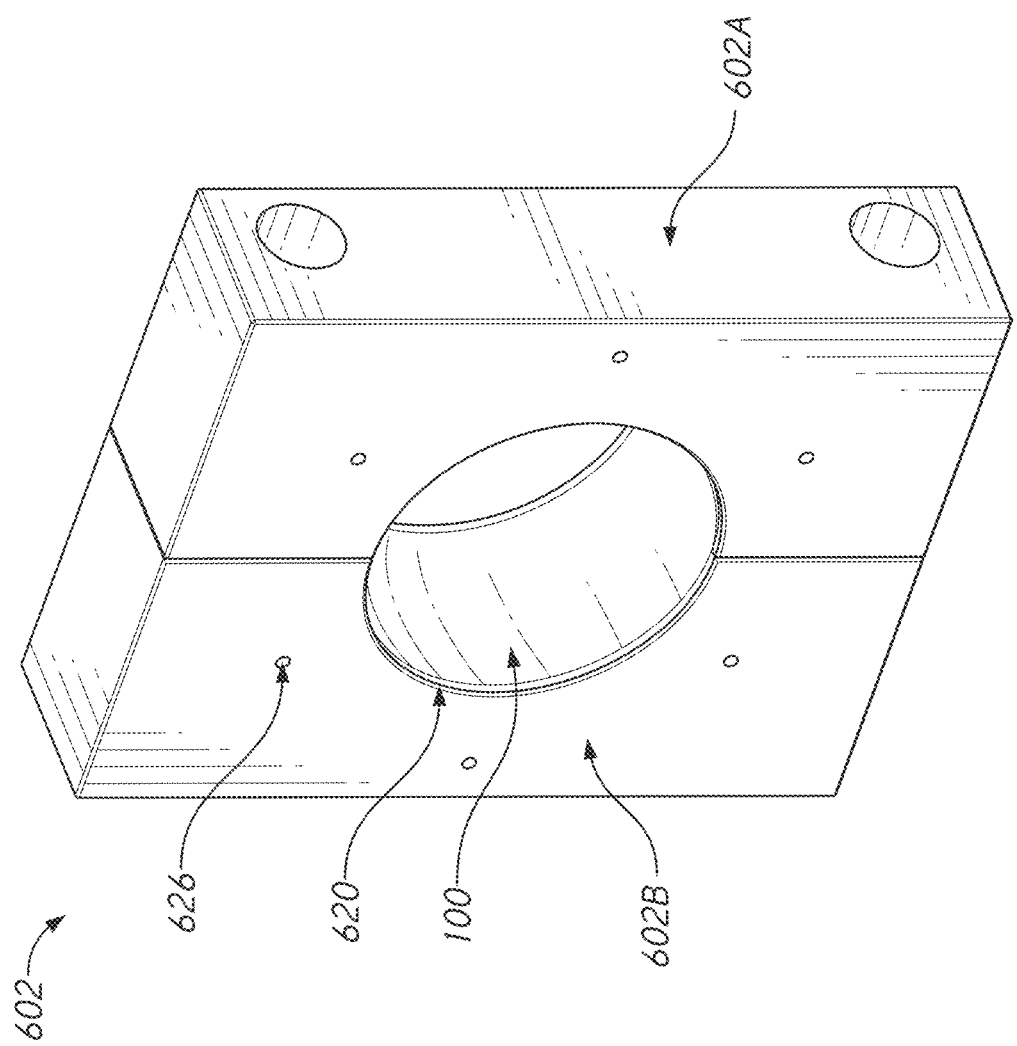
FIG. 12B is a perspective view of an outboard side of one embodiment of a mounting block.
Figure 12C:
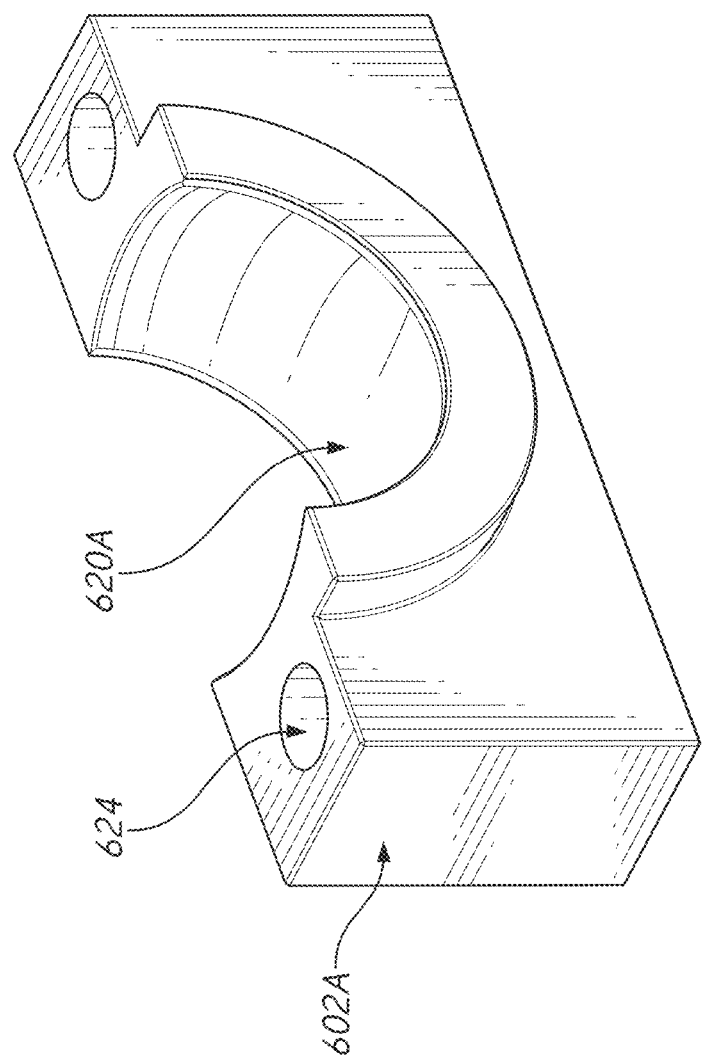
FIG. 12C is a perspective view of an inboard side of a portion of the mounting block shown in FIG. 12A.

As shown in FIGS. 10 and 11, the bearing block assembly 600 can include a bearing block 602. FIGS. 12A-12C show that the bearing block 602 can include a first block portion 602A and a second block portion 602B. The block portions 602A, 602B can be separable in a manner similar to the rigid block member 68 of the fixed bearing block assembly 66 and the first bearing block 92 of first bearing block assembly 90. The first block portion 602A can be lifted off of or separated from the second block portion 602B to provide access to an inner periphery 620 of the block portions 602A, 602B. The inner periphery 620 can be shaped and sized (e.g., diameter, length) in a variety of different ways. For instance, the inner periphery 620 can be circular, triangular, rectangular, pentagonal, hexagonal and octagonal. The inner periphery 620 can be shaped in many other configurations other than those previously listed. A bearing assembly 100 can be placed in the inner periphery 620 to provide support for the first boss 54. The bearing assembly 100 can be secured in the inner periphery 620 in any suitable manner, such as by being received in a channel therein. In some embodiments, the bearing assembly 100 can be secured in place by a fastener, pin and key, latch, or other connector. In other embodiments, the bearing assembly can be secured in place through a more permanent method, such as through welding or bonding. In various embodiments, the shape and dimensions (e.g., diameter, length) of the bearing assembly 100 may be configured to secure to the inner periphery 602. For example, where the intersection of the inner periphery 620 is a circle, the shape of the bearing assembly 100 may resemble a circle. Where the intersection of the inner periphery 602 is a rectangle, the shape of the outer periphery of the bearing assembly 100 may resemble a rectangle.

The bearing block 602 can include a ridge 622. The ridge 622 can be formed on one or two sides of the first block portion 602A and the second block portion 602B. The ridge 622 can form a raised surface on a side of the bearing block 602. The ridge 622 can be used to connect the bearing block 602 to a structure or can be used to secure a structure to the bearing block 602. For example, a clamp 608 can be placed around the outer edge of the ridge 622 to hold a cover 606 in place. The ridge 622 can include an annular projection on a first or inboard side of the bearing block 620. The ridge 622 can provide a peripheral, e.g., a circumferential, surface 623 providing an area upon which a clamp can apply a compression force. Although the peripheral surface 623 is illustrated as flat, a concave recess can be provided in the peripheral surface 623 to receive or partly receive a portion of a clamp.

The bearing block 602 can include one or more fastener holes 626. The fastener holes 626 can be formed on one or more sides of the first block portion 602A and the second block portion 602B. The fastener holes 626 can be disposed on an outboard side, as shown. In some embodiments, fastener holes 626 can be disposed on inboard and outboard sides of the bearing block portions 602A, 602B. In some embodiments, the fastener holes 626 are through holes that extend through the block portions 602A, 602B. In other embodiments, the fastener holes 626 do not extend completely through the block portions 602A, 602B. The fastener holes 626 can be used to connect the bearing block 602 to a structure or can be used to secure a structure to the bearing block 602. For example, the fastener holes 626 can receive fasteners 612 to secure the end cap 604 to the bearing block 602. The fastener holes 626 can be used to secure the cover 606 in some embodiments.

The bearing block 602 can include through holes 624. The through holes 624 can be formed on one side of the first block portion 602A and the second block portion 602B. The through holes 624 can be used connect the bearing block 602 to a structure. For example, the through holes 624 can be used connect the bearing block 602 to the mounting brackets 51 directly or the frame 64.

The bearing block 602 provides convenience in assembling the fuel system 50 including the bearing block assembly 600. For example, the separability of the first block portion 602A from the second block portion 602B enables the first bearing assembly 100 to be inserted into the inner periphery 620 in the space between the block portions 602A, 602B. When separated, the first and second block portions 602A, 602B can have a "C" shape profile. The "C" shape refers to the first and second block portions 602A, 602B having a first side facing away from the inner periphery 620A with a second side and a third side disposed opposite to each other and at opposite ends of the first side, similar to the block members 68 and 92 discussed above. This structure allows a ring member or other portion or all of the first bearing assembly 100 to be continuous which provides a more rigid structure. A continuous solid structure ring member can be more easily handled and may be more rugged with a longer service life.

FIGS. 10 and 11 show further details of the endcap 604 and the integration thereof into the bearing block assembly 600. The end cap 604 can have a cylindrical shape with an open-ended chamber. The end cap 604 can have an opening on one side of the end cap 604 that leads to the chamber. This open-ended chamber allows for the end cap 604 to be placed around objects. For example, the end cap 604 can be placed around the first boss 54. This open-ended chamber can have a closed end at an inside surface 607 opposite to the opening to mitigate or exclude dust or debris from entering the space in the chamber. The end cap 604 can have one or more fastener holes, which allow for the end cap 604 to connect to a structure or can be used to secure a structure to the end cap 604. For example, the end cap 604 can be fastened to a side of the bearing block 602. The fastener holes can be disposed on a radially outwardly extending annular flange 605. An inboard side of the flange 605 can make contact with outside surfaces of the block portions 602A, 602B.

As shown in FIGS. 10 and 11, the bearing block assembly 600 can include a cover 606. The cover 606 can be a material that can be placed over other components. In some embodiments, the cover 606 can have a hollowed center, which allows for the cover 606 to be slid over other components. For example, the cover 606 can be slid or placed over the first boss 54. The cover 606 can be made from a flexible material, such as natural or synthetic fabric, rubber, silicone, neoprene, nitrile rubber, PTFE, or other plastics. This flexible material allows the cover 606 to expand or contract, which thus increases or decreases the overall length of the cover 606. The cover 606 can be connected to other components through a clamp 608. For example, the cover 606 can be connected to the bearing block 602 and the first boss 54 of the fuel tank 52 with two clamps 608. For example, a first clamp 608 can be disposed on the bearing block 602, e.g., by compression onto the peripheral surface 623, and a second clamp 608 can be disposed on a surface 625 of the first boss 54. The first and second clamps 608 can have the same configuration, e.g., similar to hose clamps in one embodiment.

The bearing block assembly 600 can be used to prevent the ingress of dust and other debris into the inner periphery 620 and the first boss 54. As shown in FIGS. 10 and 11, the bearing block 602, end cap 604, and cover 606 can be used to envelop most of, or all of, the outer surface 56 of the first boss 54. For example, the cover 606 can be used for coverage of the first boss 54 between the connecting point 508 of the fuel tank and the connecting point to bearing block 602, while the end cap can be used to for coverage of the first boss 54 between the bearing block 602 and the end of the first boss 54. As a result of this coverage, the bearing block assembly 600 can greatly limit the amount of debris that can enter into the inner periphery 620. This coverage can also keep the outer surface 56 of the first boss 54 free from debris. The use of wipers 112 in the interface between the bearing block 602 and the boss 54 can further exclude debris from this interface.

Figure 9:
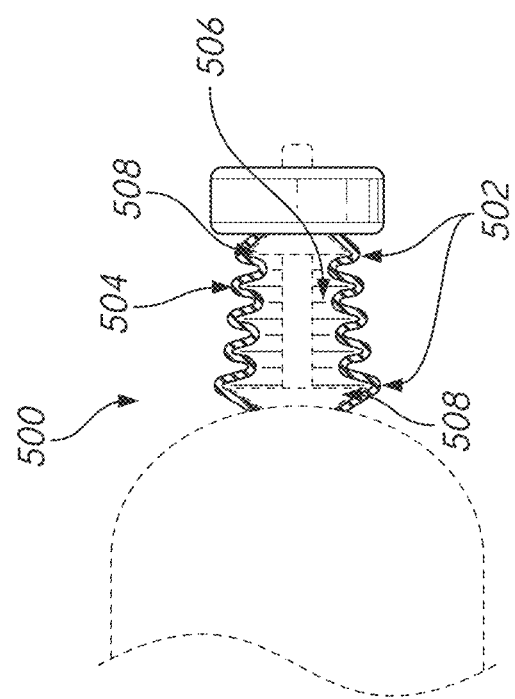
FIG. 9 is a detail view of a portion of a modified embodiment of the fuel tank and mounting block assembly of FIG. 8.

As noted above, the bearing block assembly 600 can permit some movement between the bearing block assembly 600 and the first boss 54. The fuel tank 52 can be somewhat expanded, e.g., elongated, when under pressure in part due to the materials used to form the fuel tank 52. As the fuel tank 52 expands or contracts, the first bearing assembly 100 disposed within the bearing block assembly 600 can allow for first boss 54 to move relative thereto. The cover 606 can expand, e.g., elongate, or contract, e.g., foreshorten, along with the fuel tank 52, which allows for cover 606 to maintain its coverage over the first boss 54. The cover 606 can include a bellows-type member, as discussed above in connection with FIGS. 8-9 or can comprise a material or structure that permits elastic expansion and/or contraction. The chamber of the endcap 604 can be sized so as to allow for the fuel tank 52 to expand without the inside surface 607 of the endcap contacting the first boss 54. For example, the inside surface 607 of the endcap 604 can be spaced away from the end of the first boss 54 or a plug 610 enclosing an access passage in the boss 54 at or beyond the expected travel distance of the first boss 54 or plug 610. Thus, the bearing block assembly 600 can maintain its coverage of the first boss 54 while the fuel tank 52 expands or contracts without interfering with the expected expansion and contraction of the boss 54 and/or the plug 610.

Fuel System with Sacrificial Neck Sleeve

During use, the boss of a fuel tank can experience wear due to pressurization, vibration, debris, and/or misalignment when the fuel tank is neck-mounted within a fuel system. For example, the outer surface of the boss can chafe against a mounting bracket supporting the boss. Damage to the boss of a fuel tank can make it necessary to repair or replace the fuel tank or portions of the fuel tank. Providing a wear surface that is separable from the fuel tank, such as a sacrificial neck sleeve, would advantageously reduce or prevent damage to the fuel tank (e.g., to the boss of the fuel tank). Further, such a wear surface could be removed and replaced more easily and inexpensively than could a fuel tank.

Figure 13:
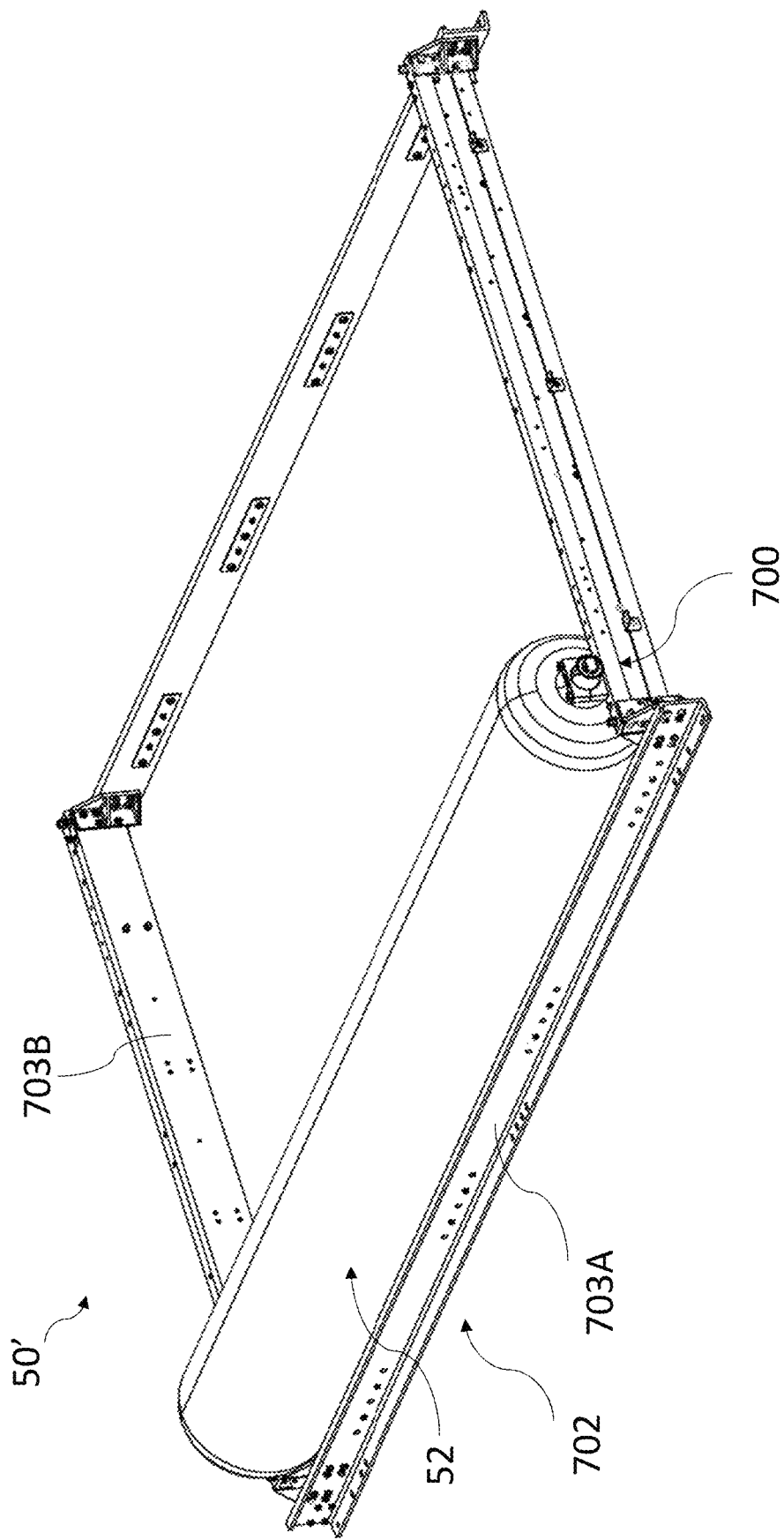
FIG. 13 is a perspective view of an embodiment of a fuel system.

FIG. 13 shows another embodiment of a fuel system 50'. The fuel system 50' can be similar to the fuel system 50 described elsewhere herein, the disclosure of which can supplement the disclosure below. The disclosure of the fuel system 50' can supplement the other fuel systems described herein. The fuel system 50' can be mountable on a heavy-duty vehicle, such as a tractor-trailer. The fuel system 50' can include one or more fuel tank(s) 52, a mounting assembly 700, and a frame 702. Each fuel tank 52 can include a central portion (e.g., a central cylindrical portion) and an end assembly. The central portion of the fuel tank 52 can include a carbon fiber reinforced polymeric liner. The end assembly of the fuel tank 52 can include a dome portion and a metallic boss, where the dome portion extends between the central cylindrical portion and the metallic boss. In some embodiments, the carbon reinforcement can extend over the polymeric liner and over at least a portion of the dome portion. The mounting assembly 700 can include, or be supported by, the frame 702. The mounting assembly 700 can include, or be coupled to, a block member(s) that receives one or more bosses 54, 58 of the fuel tank 52 (the first boss 54 and the second boss 58 are shown schematically in FIG. 2A). Each boss 54, 58 can include a mounting surface (e.g., an outer surface).

The mounting assembly 700 can be configured for mounting to a rooftop of a vehicle. For example, longitudinal members 703A of the frame 702 can extend along one or more tank(s) 52. The longitudinal members 703A can be configured with connection brackets or members for securing the mounting assembly 700 to an upper chassis portion of a vehicle forming a structure of a rooftop of the vehicle. Transverse members 703B can be provided to connect two or more longitudinal members 703A. The length of and spacing between the longitudinal members 703A can correspond to the location of connection points of the vehicle chassis. The length of and spacing between the transverse members 703B can correspond to the location of connection points of the vehicle chassis. The frame 702 can be configured to support tanks 52 that are horizontally aligned, e.g., such that central longitudinal axes of the tanks 52 are disposed in a horizontal plane. The frame 702 can be configured to support tanks 52 that are vertically offset, e.g., such that central longitudinal axes of the tanks 52 are disposed in different horizontal planes. The frame 702 can support other structures, such as platforms to support other loads, including cargo and service personnel. Though not shown, the fuel system 50' will be understood to also include tubing to convey the fuel from within the tank(s) 52 to a combustion engine, fuel cell or other load drawing from the fuel system 50'.

As illustrated in FIG. 13 and shown in greater detail in FIGS. 14A-14C and 16, another embodiment of a bearing block assembly 710 (e.g., bearing block assembly, mounting block assembly, bearing block, mounting block, mounting member, mounting portion, and/or the like) can be used with the fuel system 50'. The bearing block assembly 710 can be similar to the bearing block assemblies described elsewhere herein, the disclosure of which can supplement the disclosure below. The disclosure of the bearing block assembly 710 can supplement the other bearing block assemblies described herein. For example, the sacrificial sleeves described herein can be used with any of the tanks and/or bearing or mounting assemblies disclosed herein, and any portion of the bearing or mounting assemblies disclosed herein can be used with the assemblies described and shown as including a sleeve. The bearing block assembly 710 can permit some movement between the first boss 54 and the bearing block assembly 710. The bearing block assembly 710 can include a bearing block 712 with an inner periphery 714 and an outer periphery 716. In some embodiments, the inner periphery 714 provides a bearing support space for supporting a bearing (e.g., a bearing having a spherical outer surface, such as is illustrated in FIGS. 4-7), where the bearing is configured to contact a sleeve 750 that is disposed around the first boss 54. In some embodiments, the inner periphery 714 provides a support space having or disposed within a support surface (e.g., a tank component support surface) that is configured to directly contact a sleeve 750 that is disposed around the first boss 54. The support space can support a portion of the sleeve 750 over the boss 54. The sleeve 750 can be made of any material that provides a wear surface for the boss 54. In some embodiments, the support space (e.g., support surface) of the inner periphery 714 (and/or the entire mounting block portions 712A, 712B) can be made of a more wear-resistant (e.g., harder) material than the sleeve 750. In some embodiments, the mounting block comprises a homogenous material from an inner periphery 714 to an outer periphery 716 of the block 712. In some embodiments, the sleeve 750 comprises a homogenous material from an inner periphery 752 to an outer periphery 754 of the sleeve 750. In some embodiments, the bearing block 712 comprises aluminum and the sleeve 750 comprises a thermoplastic material (such as an acetal or other polymer). In some embodiments, the sleeve 750 comprises a self-lubricating polymer, such as an acetal copolymer or homopolymer. In some embodiments, the sleeve 750 comprises a polymer (such as a thermoplastic polymer, acetal, nylon, and/or the like) and the bearing block 712 comprises a metal (such as aluminum, steel, titanium, and/or the like). In some embodiments, the block 712 comprises A380 Aluminum. In some embodiments, the block 712 has a hardness of 80 HB. In some embodiments, the block 712 is anodized (e.g., with a surface finish on the support surface of 32 RMS). In some embodiments, the sleeve 750 comprises Delrin. In some embodiments, the sleeve 750 has a hardness of Rockwell R120. In some embodiments, the sleeve 750 further comprises a material that is less wear-resistant than the material of the boss 54. This can be desirable particularly in a situation where the sleeve 750 may be at least somewhat restrained from longitudinal and/or rotational motion with respect to the boss 54, but where at least some small relative motion may occur during use, such as through vibration, thermal changes, and/or the like.

Figure 14B:
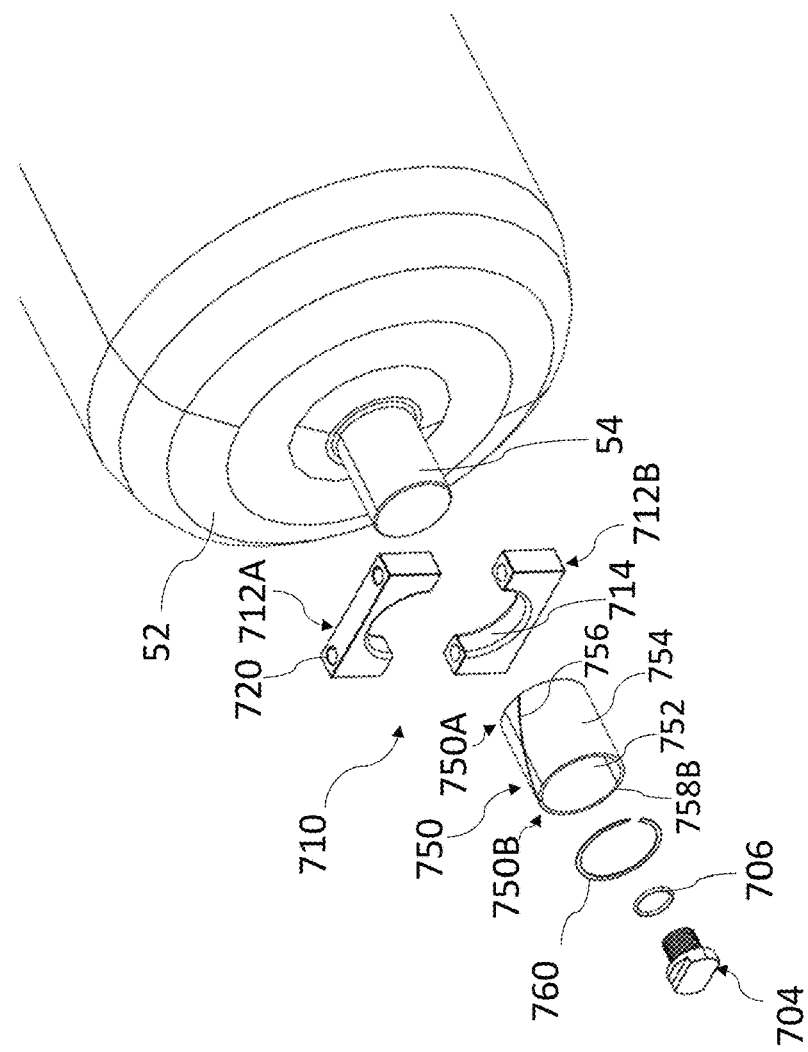
FIG. 14B is an exploded view of the fuel tank, mounting block assembly, sleeve, and retaining ring of FIG. 14A.
Figure 14A:
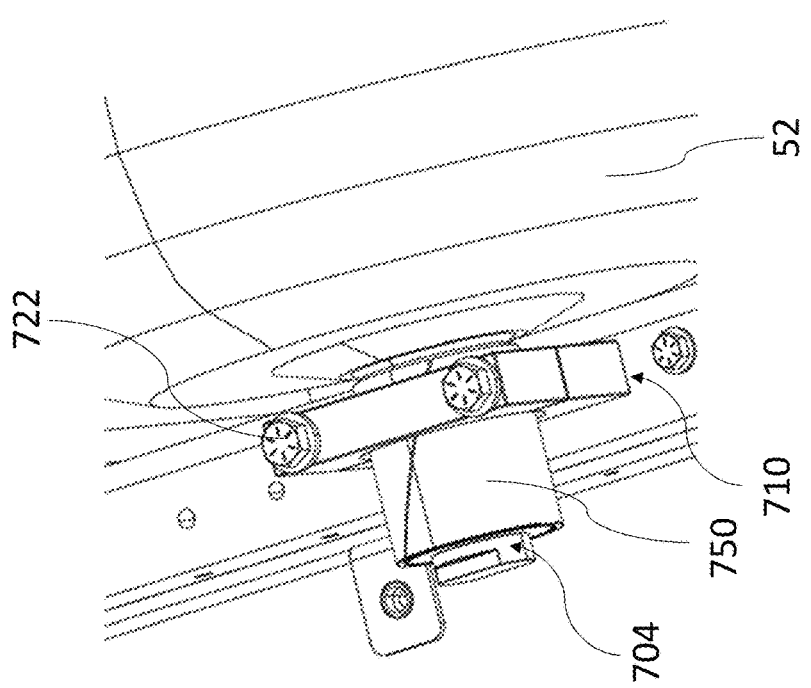
FIG. 14A is a perspective view of an embodiment of a fuel tank, mounting block assembly, and removable sleeve that can be coupled to a boss of the fuel tank using a retaining ring to protect the boss from damage during the expansion of the tank when pressurized.
Figure 14C:
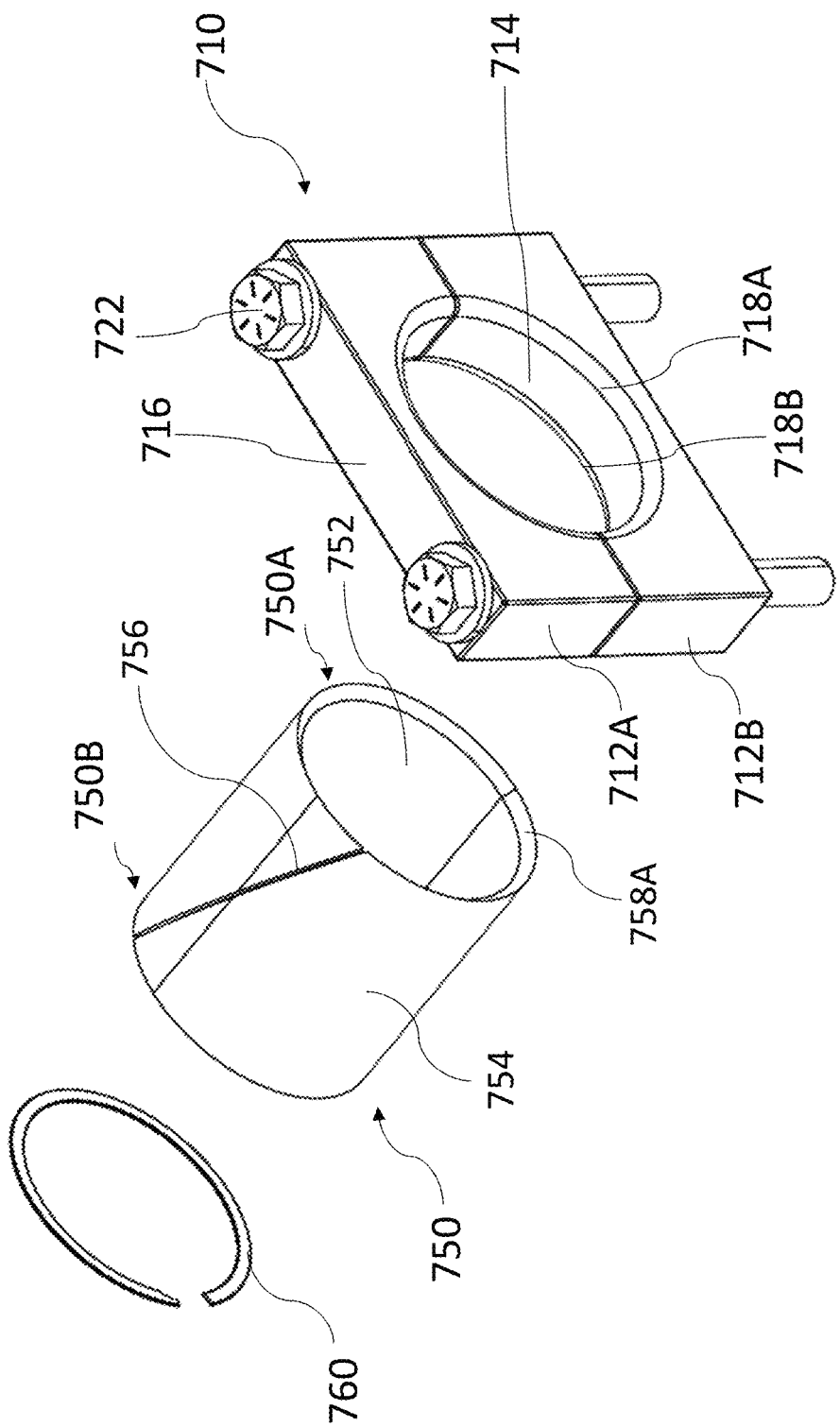
FIG. 14C is an exploded view of the mounting block assembly, sleeve, and retaining ring of FIG. 14A.

As shown in FIGS. 14A-14C, the bearing block 712 can include a first block portion 712A and a second block portion 712B. The block portions 712A, 712B can be separable in a manner similar to the bearing block 602 of the bearing block assembly 600, the rigid block member 68 of the fixed bearing block assembly 66, and the first bearing block 92 of first bearing block assembly 90. As illustrated in FIG. 14B, the first block portion 712A can be lifted off of or separated from the second block portion 712B to provide access to the support surface of the inner periphery 714 of the bearing block 712 (e.g., the support surface of the inner peripheries of the block portions 712A, 712B). The inner periphery 714 can be shaped and sized (e.g., diameter, length) in a variety of different ways. For instance, the inner periphery 714 can be circular, triangular, rectangular, pentagonal, hexagonal and octagonal. The inner periphery 714 can be shaped in many other configurations other than those previously listed. In some embodiments, a bearing assembly can be placed in the inner periphery 714. Further, some embodiments may form the inner periphery 714 using a single member or block, instead of having one block portion be separable from another block portion. In such a design, the fuel tank boss 54 may be installed by, for example, sliding the boss 54 into the mounting block 712, sliding the mounting block 712 over the boss 54, and/or the like.

Figure 16:
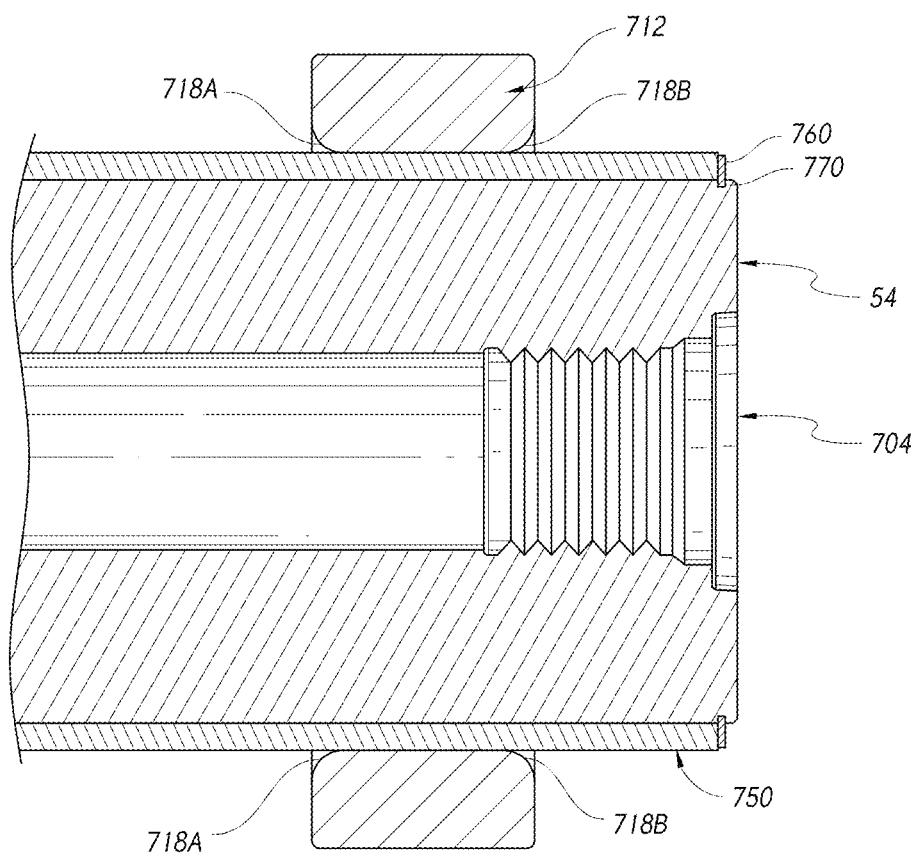
FIG. 16 is a cross-sectional view of a boss of a fuel tank, mounting block, sleeve, retaining ring, and plug.

As shown in FIG. 14C, the bearing block 712 can include a first edge 718A on a first end and a second edge 718B on a second end opposite the first end. As illustrated in FIGS. 14C and 16, the interface between the first edge 718A and the inner periphery 714 can include a rounded portion (e.g., a curved surface, a convex surface, a radiused edge, and/or the like). The interface between the second edge 718B and the inner periphery 714 can include a rounded portion (e.g., a curved surface, a convex surface, a radiused edge, and/or the like). The curved surface(s) can advantageously reduce stress and/or wear on the sleeve 750 resulting from any lateral load on the sleeve 750 as the sleeve 750 slides longitudinally with respect to the mounting block 710 and/or any angular misalignment of the boss 54 and/or bearing block 712 when the sleeve 750 is disposed within the space formed by the inner periphery 714 of the bearing block 712.

FIG. 2A illustrates an exaggerated example of such angular misalignment, using angle 1401. In some embodiments, it may be desirable for the mounting blocks at both ends of the tank (e.g., elements 66 and 90 of FIG. 2A), to include radiused edges 718A and 718B. In some embodiments, only the mounting block that interfaces with the sleeve 750 comprises such radiused edges. In some embodiments, the radiused edges 718A and/or 718B comprise a radius that is at least 5% of an outer diameter of the sleeve 750 (e.g., a diameter of the outer periphery 754 of the sleeve 750) and/or of an inner diameter of the mounting block (e.g., the inner periphery 714 of the bearing block assembly 710). In some embodiments, the radiused edges 718A and/or 718B comprise a radius that is at least 2%, 3%, 4%, 5%, 6%, 7%, 8%, 9%, or 10% of an outer diameter of the sleeve 750 (e.g., a diameter of the outer periphery 754 of the sleeve 750) and/or of an inner diameter of the mounting block (e.g., the inner periphery 714 of the bearing block assembly 710).

In some embodiments, the sleeve 750 may be used in combination with a mounting block assembly that includes a separate component that helps to account for or limit wear on the sleeve due to angular misalignment. For example, the sleeve 750 may be used in combination with a bearing assembly, such as bearing assembly 100 of FIG. 4, which includes a convex outer surface 101 that fits into a corresponding concave surface of the mounting block in order to help account for angular misalignment. In some embodiments, however, the sleeve 750 may be configured to be in direct contact with, or to be directly supported by, the inner surface of a mounting block or mounting block assembly (such as inner surface 714 of FIG. 14C), with no additional bearing or other component therebetween. For example, in some embodiments there is no bearing, bushing, and/or the like between the sleeve 750 and the mounting block or mounting block assembly (such as inner surface 714 of the bearing block 712). Radiused edges 718A and/or 718B can be particularly beneficial in such embodiments. The sleeve 750 may also be used in combination with any wipers disclosed herein, such as to limit introduction of debris while at the same time providing the sacrificial surface on the sleeve 750 to absorb any wear from debris or otherwise.

The bearing block 712 can include a plurality of apertures 720 configured to receive fasteners 722. The apertures 720 can extend through the entire height of the bearing block 712 (e.g. in a direction perpendicular to the longitudinal length of the fuel tank 52, through the outer periphery 716 on the upper portion of the bearing block 712 and beyond the outer periphery 716 on the lower portion of the bearing block). The apertures 720 can extend through the first block portion 712A and the second block portion 712B. A fastener 722 can be inserted into each aperture 720, through the bearing block 712 (e.g., through the first block portion 712A and the second block portion 712B), and into openings in the mounting assembly 700. This arrangement can advantageously allow the first and second block portions 712A, 712B to be secured in position relative to one another and can allow the bearing block 712 to be secured to the mounting assembly 700.

In some embodiments, as shown in FIGS. 14A and 14B, a plug 704 can be used with the fuel system 50'. The plug 704 can be similar to the plug 610 described elsewhere herein, the disclosure of which can supplement the disclosure hereinbelow. The plug 704 can be configured to enclose an access passage in the first boss 54 at or beyond the expected travel distance of the first boss 54 or plug 704. In some embodiments, as illustrated in FIG. 14B, the plug 704 includes a threaded portion that is compatible with a corresponding portion of the access passage in the first boss 54. In some embodiments, as shown in FIG. 14B, an O-ring 706 is positioned between the plug 704 and the first boss 54 to improve the seal between the plug 704 and the access passage of the first boss 54.

As shown in FIGS. 14A-16, a sleeve 750 can be used with the fuel system 50'. The sleeve 750 can be a sacrificial component configured to protect the boss 54 of the fuel tank 52 from damage. The sleeve 750 can be configured to be disposed around the boss 54. The sleeve 750 can be removably coupled to the boss 54. The sleeve 750 can be replaceable. A damaged sleeve 750 can be easier and/or cheaper to replace than a damaged fuel tank 52. In some embodiments, it may be possible to replace the sleeve 750 without removing the fuel tank 52 from the mounting block 712. In some embodiments, such as when the mounting block 712 is a single piece or multiple pieces, the sleeve 750 may be removable and/or replaceable without removing the fuel tank 52 from the mounting block 712, by removing the retaining ring 760 and sliding the sleeve 750 off of the boss 54 while the mounting block 712 remains in place. In some embodiments, such as when the mounting block 712 is part of a mounting block assembly 710 having more than one mounting block component, one of the first and second portion of the mounting block assembly 710 may be separated from the other of the first and second portion to provide easier access to the sleeve 750 for purposes of removal of the sleeve. In some embodiments, the tank 52 may be moved a small distance longitudinally and/or laterally away from the mounting block 712 to facilitate removal and/or replacement of the sleeve 750. Additionally, the inclusion of a sleeve 750 can make it easier to identify signs of wear. For example, signs of wear can include the presence of plastic shavings, an inconsistent gap between the mounting block and the sleeve, and/or variations in the diameter of the sleeve.

The sleeve 750 can have a first end 750A, a second end 750B opposite the first end 750A, an inner periphery 752, and an outer periphery 754. In some embodiments, the sleeve 750 can have a thickness of approximately 0.125 in (measured as the wall thickness between inner periphery 752 and outer periphery 754). In some embodiments, the sleeve 750 can have a thickness of at least 0.05 in, 0.075 in, 0.10 in, 0.125 in, 0.15 in, 0.175 in, 0.2 in, 0.225 in, or 0.25 in. In some embodiments, the sleeve 750 can have a length of approximately 3 in. In some embodiments, the sleeve 750 can have a length of at least 1 in, 1.5 in, 2 in, 2.5 in, 3 in, 3.5 in, 4 in, 4.5 in, 5 in, 5.5 in, or 6 in.

The inner periphery 752 of the sleeve 750 can be coupled to a mounting surface (e.g., outer surface) of the boss 54 such that the sleeve 750 is restrained longitudinally relative to the boss 54 and configured to slide longitudinally relative to the support surface of the inner periphery 714 of the bearing block assembly 710 (e.g., the inner periphery of the bearing block 712) upon expansion of the fuel tank 52 when the fuel tank 52 is pressurized. The first end 750A can be configured to be positioned adjacent to a dome portion of the fuel tank 52 when the sleeve 750 is disposed around the boss 54. The second end 750B can be configured to be positioned adjacent to an outer end of the boss 54 when the sleeve 750 is disposed around the boss 54. The sleeve 750 can have a cylindrical shape. The sleeve 750 can have an interruption in the circumference of the sleeve, such as a slit, gap, seam, or opening. For example, a slit 756 can extend between opposing ends of the sleeve 750. The slit 756 can extend through the outer periphery 754 and the inner periphery 752 along a portion of the sleeve 750. The slit 756 can advantageously allow for less precise tolerances between the diameter of the sleeve 750 and the outer diameter of the boss 54. The diameter of the sleeve 750 can be undersized relative to the mounting surface of the boss 54 to enable a tight fit between the sleeve 750 and boss 54. Therefore, the sleeve 750 can be used on the boss 54 even if the diameter of the sleeve 750 is smaller than or equal to the outer diameter of the boss 54. In some embodiments, the sleeve 750 can compress around the boss 54 when the slit 756 is expanded (such as, for example, due to the elasticity of the material of the sleeve 750).

In some embodiments, the outer circumference of the sleeve 750 is uninterrupted. For example, in some embodiments, the sleeve 750 does not include a slit, gap, seam, opening, and/or the like.

Figure 15:
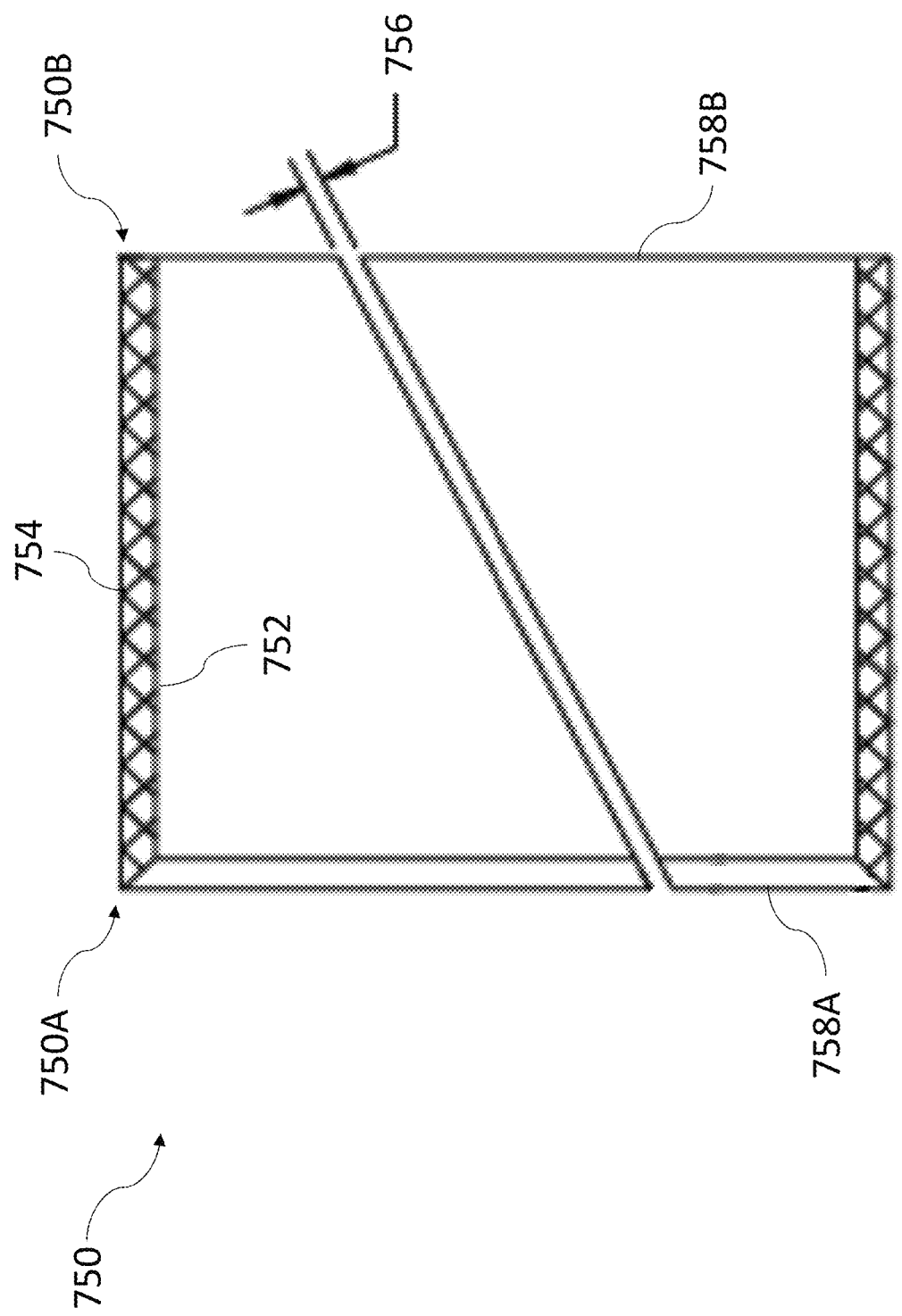
FIG. 15 is a cross-sectional view of the sleeve of FIG. 14A.

A first surface or edge 758A on the first end 750A of the sleeve 750 can have different characteristics than a second surface or edge 758B on the second end 750B of the sleeve 750. For example, as shown in FIGS. 14B, 14C, and 15, the first edge 758A can be chamfered and the second edge 758B can be less chamfered (e.g., having a smaller chamfer) than the first edge or non-chamfered (e.g., not having a chamfer, having an edge break, or being flat). The chamfered first edge 758A can be positioned adjacent to the end of the boss 54 that is closest to the dome portion of the fuel tank 52 when the sleeve 750 is disposed around the boss 54. The chamfer can advantageously allow the sleeve 750 to fit on a boss 54 with a blend radius. The less or non-chamfered second edge 758B can be positioned adjacent to the end of the boss 54 that is further from the dome portion of the fuel tank 52 when the sleeve 750 is disposed around the boss 54. The less or non-chamfered second edge 758B can be configured to abut a retaining ring 760. The less or non-chamfered (or at least less-chamfered) second edge 785B can be desirable, for example, to provide a larger surface area to abut a retention member, such as retainer ring 760 or the like.

In some embodiments, a size of the chamfer at first edge 758A, measured radially from inner periphery 752 to the outermost edge of the chamfer, is at least 5 times a size of any chamfer or edge break at the second edge 758B. In some embodiments, the size of the chamfer at first edge 758A, measured radially from inner periphery 752 to the outermost edge of the chamfer, is at least 3, 4, 5, 6, 7, 8, 9, or 10 times the size of any chamfer or edge break at the second edge 758B. In some embodiments, the size of the chamfer at first edge 758A, measured radially from inner periphery 752 to the outermost edge of the chamfer, is at least 75% of a thickness of the wall of the sleeve 750 (measured from inner periphery 752 to outer periphery 754). In some embodiments, the size of the chamfer at first edge 758A, measured radially from inner periphery 752 to the outermost edge of the chamfer, is at least 50%, 60%, 70%, 75%, 80%, or 90% of the thickness of the wall of the sleeve 750 (measured from inner periphery 752 to outer periphery 754).

Figure 14D:
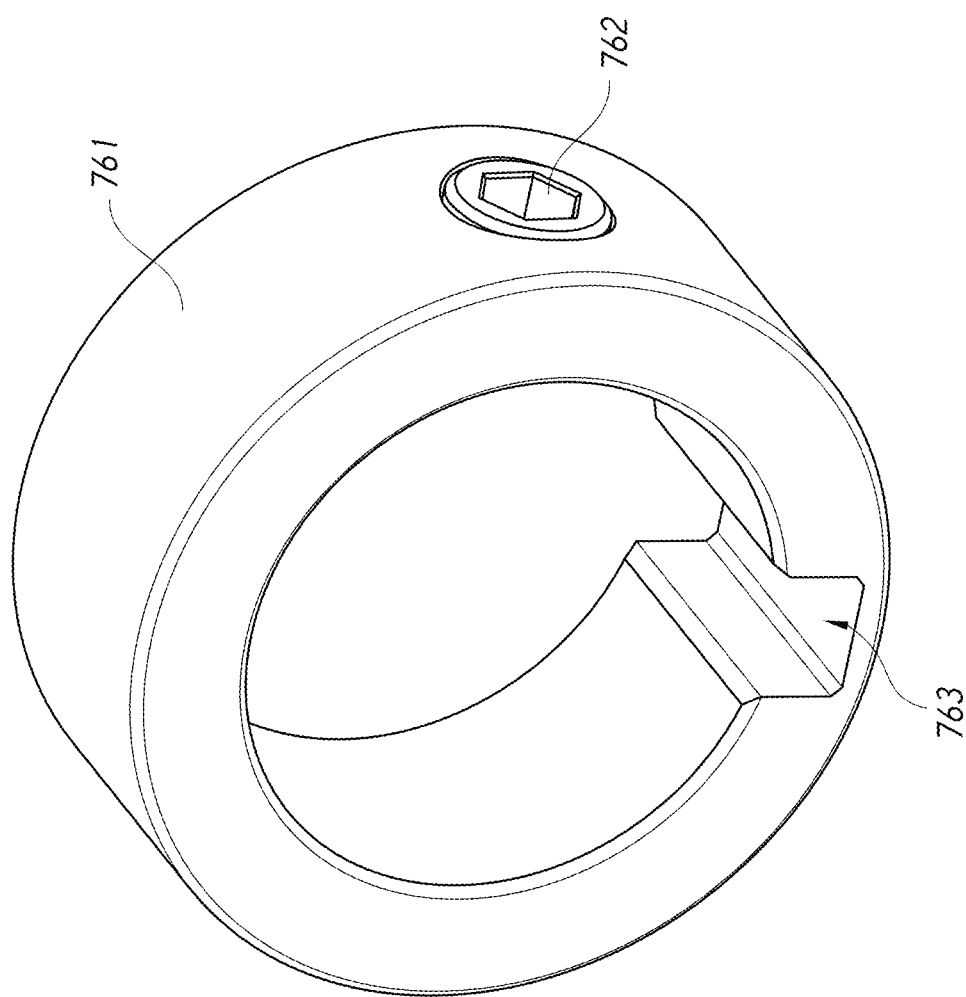
FIG. 14D is an example retaining portion comprises a ring and set screw.

The sleeve 750 can be secured in position with respect to the boss 54 using a retaining portion, such as a retaining ring 760, threads, adhesive, and/or an interference fit. The outer shape of the retaining ring 760 can be circular or any other shape. For example, the outer shape can be hexagon or square. In some embodiments, the retaining portion can be a ring 761 and set screw 762, as shown in FIG. 14D. The ring 761 and set screw 762 can include a keyway 763. The retaining portion can be configured to removably secure the sleeve 750 to the boss 54 so that the sleeve 750 does not unintentionally slide off of the boss 54. In some embodiments, the sleeve 750 can be restrained relative to the boss 54 (e.g., there is limited movement allowed between the sleeve 750 and the boss 54). For example, in some embodiments, the sleeve 750 is not movable longitudinally by more than 0.1%, 0.5%, 1%, 2%, 3%, 4%, 5%, or 6% of the length of the sleeve 750. In some embodiments, the sleeve 750 can be fixed relative to the boss 54 (e.g., there is no movement allowed between the sleeve 750 and the boss 54). For example, in some embodiments, the sleeve 750 is not movable longitudinally with respect to the boss 54. As shown in FIG. 16, the retaining portion can include a retaining ring 760 configured to be positioned between an outer edge of the sleeve 750 (e.g., the second edge 758B at the second end 750B of the sleeve 750) and a lip 770 at the end of the boss 54 (e.g., the end of the boss 54 furthest from the dome portion of the fuel tank 52 and closest to the second end 750B of the sleeve 750 when the sleeve 750 is disposed around the boss 54). The outer edge of the sleeve 750 can be an outboard edge in the case of a fuel system 50 that is mounted transversely relative to a vehicle and can be a forward or rearward edge in the case of a fuel system 50' that is mounted longitudinally relative to a vehicle. In some embodiments, a portion of the retaining ring 760 is positioned within a groove in the outer surface of the boss 54, which positions the retaining ring 760 longitudinally between the edge 758B of the sleeve 750 and the lip 770 of the boss 54. In some embodiments, a spring or other compressible member (e.g., a disc spring, wave spring, o-ring, gasket, and/or the like) can be positioned between the retaining ring 760 and the sleeve 750 (and/or between the sleeve 750 and the boss 54, between the retaining ring 760 and the lip 770, and/or the like) to take up any tolerances between the sleeve 750 and the ring 760, thereby preventing the sleeve 750 from freely moving longitudinally. In some embodiments, the length of the sleeve 750 and the position of the groove that retains the retaining ring 760 are dimensioned such that there is relatively little clearance between the retaining ring 760 and the sleeve 750 in the installed position. In some embodiments, the length of the sleeve 750 and the position of the groove that retains the retaining ring 760 are dimensioned such that there is an interference fit between the retaining ring 760 and the sleeve 750 in the installed position. The retaining ring 760 can be a C-shaped ring, or can be any other suitable shape of retaining ring (e.g., a spiral retaining ring, a tapered section retaining ring, a constant section retaining ring, a circlip, and/or the like). The retaining ring 760 can include a gap between a first end and a second end of the ring 760. In some embodiments, the inner surface of the sleeve 750 and the outer surface of the boss 54 may comprise one or more anti-rotation features, such as a spline, a keyway, a protrusion, an interlocking feature, and/or the like, that limits or prevents relative rotation between the sleeve 750 and the boss 54.

The retaining ring 760 can be removable and/or replaceable. The retaining ring 760 can be removed from the fuel system 50' to facilitate removal of the sleeve 750 from the fuel system 50'. For example, after the retaining ring 760 has been removed, the sleeve 750 can be slid off of the boss 54.

The bearing block 712 can be disposed around a portion of the sleeve 750 when the sleeve 750 is disposed around the boss 54. The inner periphery 714 of the bearing block 712 can contact a portion of the outer periphery 754 of the sleeve 750. The length of the sleeve 750 can be greater than the length of the bearing block 712 (e.g., the length of the inner periphery 714). This can be desirable, for example, to account for tolerances in installation and/or to allow for sliding of the sleeve 750 with respect to the bearing or mounting block 712 during use. For example, the length of the sleeve 750 can be about 2-8 times greater than the length of the bearing block 712 (e.g., the length of the inner periphery 714). In some embodiments, the length of the sleeve is at least 1.5, 2, 3, 4, 5, 6, 7, 8, 9, or 10 times greater than the length of the bearing block 712 (e.g., the length of the inner periphery 714).

The bearing block 712 can include a one piece block, e.g., similar to the bearing block assembly 190. The slidability of the sleeve 750 relative to the bearing block 712 facilitates assembly of the boss 54 and sleeve 750 in the block 712. By enabling the sliding of the sleeve 750 and boss 54 into the block 712 the assembly thereof is made much simpler. Also, the assembly has fewer components.

The bearing block 712 can include a multiple piece block, e.g., a two piece block similar to the bearing block assembly 710. The two piece bock assembly 710 allows the sleeve 750 to be placed on a partial support surface disposed on one of the mounting block portions 712A, 712B. Thereafter the other of the mounting block portions 712A, 712B can be assembled over the sleeve 750 to enclose the sleeve in a support surface.

In some embodiments, a method of using, installing, removing, and/or replacing a sleeve 750 from a neck (e.g., boss) of a fuel tank 52 is provided. In some embodiments, an inner surface 752 of the sleeve 750 may be touching the outer surface of the boss 54. In some embodiments, the outer surface 754 of the sleeve 750 may be exposed to be placed in direct contact with a bearing block support surface. In some embodiments, the sleeve 750 may be elastically flexible to be opened at the seam 756. In some embodiments, the seam 756 may be stretched, expanded, and/or the like transverse to the longitudinal axis of the boss 54, such that the inner surface 752 is larger than the diameter of the boss 54 to enable applying the sleeve 750 to the boss 54. In some embodiments, the sleeve 750 may be installable and/or removable from the boss 54 by sliding the sleeve 750 longitudinally on and/or off of the boss 54. In some embodiments, the method of replacing a sleeve 750 can comprise removing a retaining ring 760 (e.g., by longitudinally separating the ring 760 from the sleeve 750 and/or the boss 54), removing a first sleeve 750 from the boss 54 (e.g., by sliding the sleeve 750 longitudinally of off the boss 54), sliding a second sleeve 750 onto the boss 54 (e.g., by sliding the sleeve 750 longitudinally onto the boss 54), and re-attaching the retaining ring 760 (or a new retaining ring) (e.g., by coupling the retaining ring 760 to the sleeve 750 and/or the boss 54). In some embodiments, the method further comprises removing a plug 704 from a channel of the boss 54 and/or removing an o-ring 706 between the plug 704 and the boss 54 (see FIG. 14B). Removing the first sleeve 750 from the boss 54 can include stretching the sleeve 750 along the seam 756 to temporarily create a gap between the outer diameter of the boss 54 and the inner diameter of the sleeve 750. Placing the second sleeve 750 on the boss 54 can include stretching the sleeve 750 along the seam 756 to temporarily create a gap between the outer diameter of the boss 54 and the inner diameter of the sleeve 750. In some embodiments, a chamfer, rounded surface, tapered surface, and/or the like of the sleeve (such as the chamfered first edge 758A of the sleeve 750) can be used to expand or stretch the sleeve as the sleeve begins to be pressed longitudinally onto the boss 54. In some embodiments, the boss 54 may also or alternatively comprise a chamfer, rounded surface, tapered surface, and/or the like that helps to expand or stretch the sleeve as the sleeve begins to be pressed longitudinally onto the boss 54.

While certain embodiments of the inventions have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

What is claimed is:

1. A fuel tank assembly, comprising:
   a tank comprising a first boss at one end and a second boss located at an end of the tank opposite the first boss;

a bearing block comprising a first inner portion comprising a tank component support surface; and
a sleeve having a length longer than a length of the bearing block, the sleeve configured to be disposed over the first boss and slide longitudinally relative to the tank component support surface of the bearing block upon expansion of the tank when pressurized.

2. The fuel tank assembly of claim 1, wherein the sleeve is removably coupled to the first boss and replaceable.

3. The fuel tank assembly of claim 1, wherein the tank component support surface of the bearing block comprises a more wear-resistant material than the sleeve.

4. The fuel tank assembly of claim 1, wherein the length of the sleeve is greater than a length of the tank component support surface.

5. The fuel tank assembly of claim 1, wherein the sleeve comprises a first edge on a first end of the sleeve and a second edge on a second end of the sleeve opposite the first end, wherein the first edge is chamfered and the second edge is not chamfered.

6. The fuel tank assembly of claim 1, further comprising a retaining portion configured to removably secure the sleeve to the first boss.

7. The fuel tank assembly of claim 6, wherein the retaining portion comprises a retaining ring, threads, adhesive, an interference fit, and/or a ring and screw set.

8. The fuel tank assembly of claim 6, wherein the retaining portion comprises a retaining ring positioned between an outer edge of the sleeve and a lip of the first boss.

9. The fuel tank assembly of claim 8, wherein the retaining ring comprises a C-shaped ring having a gap between a first end and a second end of the retaining ring.

10. The fuel tank assembly of claim 8, wherein the retaining portion is configured to allow the sleeve to slide off the first boss following removal of the retaining ring from the fuel tank assembly.

11. The fuel tank assembly of claim 1, further comprising a second bearing block, the second bearing block comprising a second inner portion comprising a second tank component support surface.

12. The fuel tank assembly of claim 1, wherein the bearing block comprises a first portion and a second portion separable from the first portion, the first portion and the second portion enclosing the tank component support surface.

13. The fuel tank assembly of claim 1, wherein the sleeve comprises a slit extending between opposing ends of the sleeve.

14. A fuel tank neck support assembly, comprising:
a fuel tank assembly comprising:
a fuel tank comprising a central cylindrical portion and an end assembly comprising a dome portion extending between the central cylindrical portion and a metallic boss, the metallic boss having a mounting surface; and
a sleeve removably coupled to the mounting surface of the metallic boss such that an interior surface of the sleeve directly contacts at least a portion of the mounting surface of the metallic boss; and
a mounting block comprising a support space configured to support a portion of the sleeve over the metallic boss;
wherein the sleeve is configured to slide longitudinally relative to the mounting block while being restrained longitudinally relative to the metallic boss.

15. The fuel tank neck support assembly of claim 14, wherein the mounting block comprises a first portion and a second portion separable from the first portion, the first portion and the second portion enclosing the support space.

16. The fuel tank neck support assembly of claim 14, further comprising an endcap connected to an outer side of the mounting block, the endcap comprising an enclosed space configured to accommodate an end of the metallic boss.

17. A fuel tank assembly, comprising:
a tank comprising a first boss at one end and a second boss located at an end of the tank opposite the first boss;
a bearing block comprising a first inner portion comprising a tank component support surface; and
a sleeve comprising an inner periphery and an outer periphery, wherein the inner periphery of the sleeve is coupled to a mounting surface of the first boss such that the sleeve is restrained longitudinally relative to the first boss and configured to slide longitudinally relative to the tank component support surface of the bearing block upon expansion of the tank when pressurized, wherein the sleeve comprises a slit extending between opposing ends of the sleeve.

18. The fuel tank assembly of claim 17, wherein the sleeve comprises a first edge on a first end of the sleeve and a second edge on a second end of the sleeve opposite the first end, wherein the first edge is chamfered and the second edge is not chamfered.

19. The fuel tank assembly of claim 17, further comprising a retaining portion configured to removably secure the sleeve to the first boss.

20. The fuel tank assembly of claim 19, wherein the retaining portion comprises a retaining ring, threads, adhesive, an interference fit, and/or a ring and screw set.

21. The fuel tank assembly of claim 19, wherein the retaining portion comprises a retaining ring positioned between an outer edge of the sleeve and a lip of the first boss.

* * * * *